(12) United States Patent
Matsui et al.

(10) Patent No.: US 7,489,988 B2
(45) Date of Patent: Feb. 10, 2009

(54) GENERATOR CONTROL SYSTEM, GENERATING APPARATUS CONTROL METHOD, PROGRAM AND RECORD MEDIUM

(75) Inventors: Masaru Matsui, Kyoto (JP); Kazuhiro Nishitani, Osaka (JP); Eiji Noguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 157 days.

(21) Appl. No.: 10/993,322

(22) Filed: Nov. 19, 2004

(65) Prior Publication Data
US 2005/0107892 A1 May 19, 2005

(30) Foreign Application Priority Data
Nov. 19, 2003 (JP) .............................. 2003-389885
Mar. 4, 2004 (JP) .............................. 2004-060693

(51) Int. Cl.
G05D 11/00 (2006.01)
(52) U.S. Cl. .................. 700/287; 700/291; 700/295
(58) Field of Classification Search ................ 700/291, 700/286–289, 30, 295, 297, 290, 276; 307/64; 340/635
See application file for complete search history.

(56) References Cited

U.S. PATENT DOCUMENTS 5,481,140 A * 1/1996 Maruyama et al. ............ 307/11
5,949,153 A * 9/1999 Tison et al. .................... 307/29
6,487,509 B1 * 11/2002 Aisa .............................. 702/62
6,718,213 B1 * 4/2004 Enberg ......................... 700/22
6,904,337 B2 * 6/2005 Ueda et al. ................... 700/295
2001/0034569 A1 * 10/2001 Yamamoto et al. ........... 700/295
2002/0024332 A1 * 2/2002 Gardner ................... 324/103 R
2003/0078797 A1 * 4/2003 Kanbara et al. ................ 705/1
2003/0171851 A1 * 9/2003 Brickfield et al. ........... 700/286
2004/0098171 A1 * 5/2004 Horst .......................... 700/295
2004/0254654 A1 * 12/2004 Donnelly et al. .............. 700/22

FOREIGN PATENT DOCUMENTS

JP          11-098688      4/1999
JP          2002-319419 A  10/2002
JP          2003-134888 A  5/2003

* cited by examiner

Primary Examiner—Kidest Bahta
Assistant Examiner—Nathan Laughlin
(74) Attorney, Agent, or Firm—RatnerPrestia

(57) ABSTRACT

In the case where a user changes a set state of apparatuses, an apparatus operation control portion repressively controls the apparatuses, in spite of an instruction of a control signal according to that change, so that an increasing amount of power consumption of the apparatuses obtained from an apparatus power consumption measuring portion will not exceed an increasing amount of the generating capacity of a generator obtained from a generating capacity measuring portion so as to gradually bring it closer to a target set state set up by the user.

18 Claims, 9 Drawing Sheets

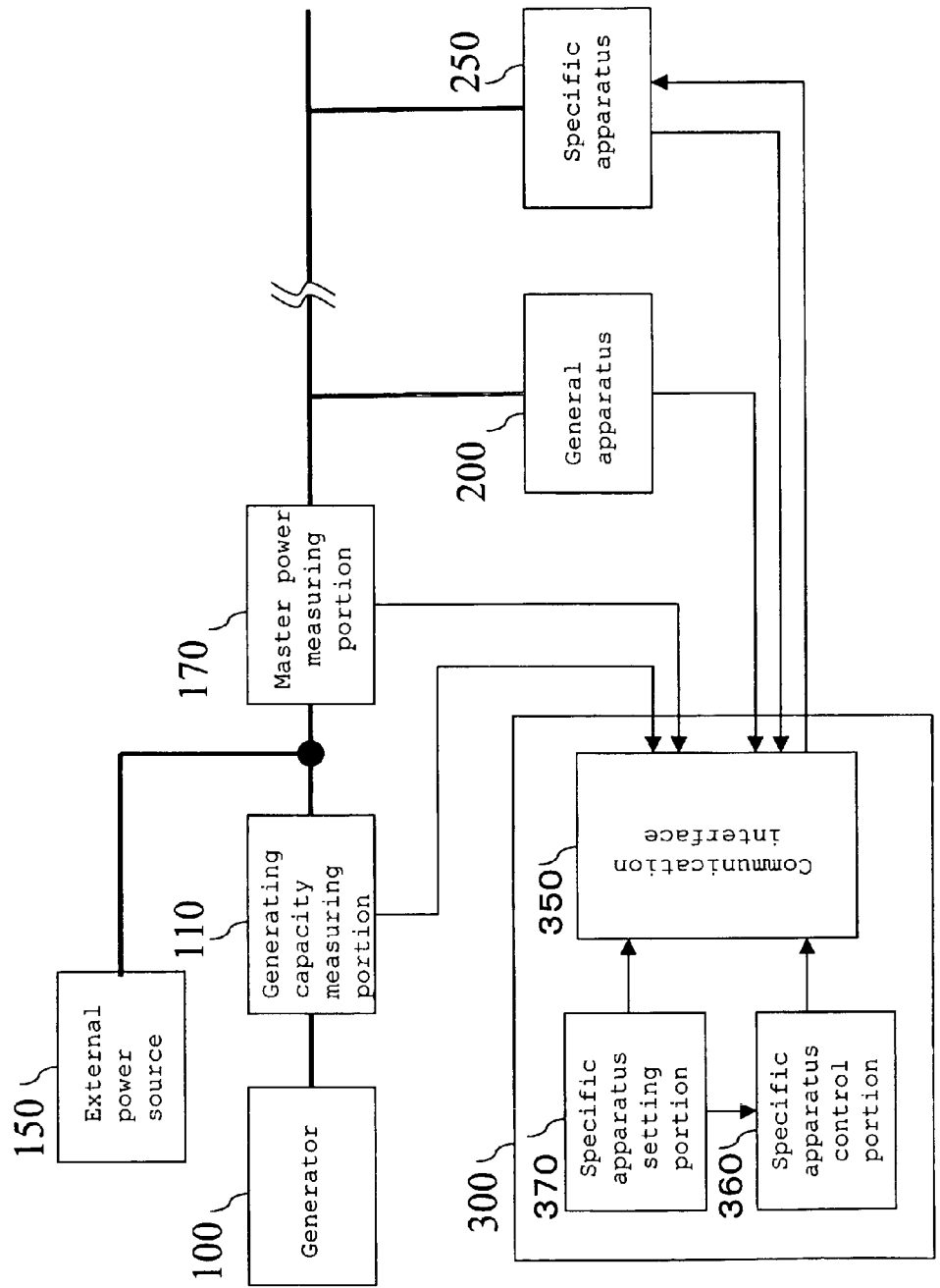

Fig.8

| Priority | Specific apparatus | Controllable attribute | Power consumption | Time per operation | Interval time |
|---|---|---|---|---|---|
| 1 | Water-storing hydronic heating toilet seat | Water-storing tank thermal insulation operation ON/OFF | 400W | Variable subject to settings | Variable subject to settings |
| 2 | Garbage disposal unit (biotech method) | Fermentation operation ON/OFF | 160W | 3 min. | 60 min. |
| 3 | Battery-driven cleaner | Charging function ON/OFF | 70W | Maximum 2 hours | — |
| 4 | Underfloor/ceiling ventilator | Ventilation ON/OFF | 30W | 10 min. | 3 hours |
| 5 | Automatic sill cock | Watering ON/OFF | 3W | 10 min. in the morning and in the evening | — |

GENERATOR CONTROL SYSTEM, GENERATING APPARATUS CONTROL METHOD, PROGRAM AND RECORD MEDIUM

BACKGROUND OF THE INVENTION

1. Field of the Invention

The present invention relates to a generator control system, a generator control method, a power control system, a power control method, a program and a record medium of matching an electric load of household electrical appliances to an output of a generator.

2. Related Art of the Invention

On introducing a fuel battery or generators such as those using a gas engine and a gas turbine to a household, what should be considered is a scale of electric load fluctuation in a general household. In these generators, improvement in total energy utilization efficiency can be expected when effectively using waste heat together with a generating capacity. However, these generators take a long time from a start until reaching a desired output, and does not follow suitably the load fluctuation of household electrical appliances used in the general household.

As a method of following the electric load fluctuation of an electric power unit such as an air conditioner under such circumstances, a command value is conventionally outputted to the generator for the sake of following the electric load fluctuation based on the electric load fluctuation of the electric power unit before issuing an output control command to the generator. In the case of this method, for instance, there is a change in control over the electric power unit exerted by a user which appears as the load fluctuation, and the change is determined not to be temporary and then output control is finally exerted on the generator side based on the load fluctuation (refer to Japanese Patent Laid-Open No. 2002-319419 for instance).

As in the conventional example, in the case of determining an output of the generator from the electric load fluctuation of the household up to this time and operating the generator to simply follow it, it is finally reflected as a response command after the electric load starts fluctuation so that there will be a delay in responsiveness as the response command to the electric load fluctuation. Therefore, a shortage of the output arises in the case where the electric load is on the increase, and so there is a problem that commercial power is bought from a power company each time and there is no cost merit.

In the case of turning off an apparatus consuming a large amount of power such as the air conditioner, it is impossible, in the conventional example in which a response command is issued after the electric load starts fluctuation, to immediately issue the output control command thereto to control the output of the generator to follow the electric load fluctuation and there is a problem that surplus power is generated. There are two means of effectively using the surplus power.

The first means is to sell the surplus power to an outside power company (electric power selling). In this case, there is a problem that there is no guarantee of a unit price of the surplus power accepted by the outside power company being equal to or more than a generation cost of the generator, and so the more power is sold, the more money is lost. The second means is to store the surplus power in an accumulator and stagger utilization time. However, there is a problem that introduction of the accumulator requires a significant amount of initial cost and the introduction thereof to the general household is not realistic.

In the case of operating the generator to follow heat load fluctuation of the household, there is a problem that the generating capacity is not completely used and the surplus power is generated likewise.

To cope with the problem of the responsiveness as the response command to the electric load fluctuation, there is another conventional method of estimating current electric load fluctuation of the household electrical appliances from past data thereon and operating the generator based on estimation results (refer to Japanese Patent Laid-Open No. 2003-134888 for instance).

However, it is difficult for the conventional method as described in the above reference as Japanese Patent Laid-open No. 2003-134888 to correctly estimate electric load fluctuation of household electrical appliances since it is caused by irregular and unscheduled activities of persons handling them.

And since the generator such as a fuel battery does not have the good generation follow-up performance with regard to the load fluctuation of household electrical appliances used in the general household as described above, even if the electric load is correctly estimated, it is not possible after all to deal with the load fluctuation exceeding generation follow-up performance of the generator so that this method does not lead to a cost merit as explained as follows.

Specifically, FIG. 6 is an example of an air conditioner. Although how it starts is different from apparatus to apparatus, maximum power/rated power of the air conditioner when air-conditioning a room is 690 W/350 W for a 2.2 kW type, 780/420 W for a 2.5 kW type, and 900/475 W for a 2.8 kW type. FIG. 6 shows a power consumption trend of the 2.5 kW type on a startup. As can be seen from FIG. 6, a current air conditioner can start in as early as one minute.

For instance, load response performance of the fuel battery as the generator is 1 W/s for both output rise and fall according to a current target specification. It takes 5 minutes to increase its output to 300 W and 10 minutes in the case of increasing it to 600 W, and as a result, it is not possible after all to deal with the load fluctuation exceeding generation follow-up performance of the generator even if the electric load is correctly estimated expecting the load fluctuation as described above.

The present invention solves the problems of a representative method of following an electric load of a conventional generator control system described in the patent document, and an object thereof is to provide a generator control system, a generator control method, a program and a record medium excellent in responsiveness as a response command to the electric load fluctuation of the household electrical appliances and capable of outputting a command value by estimating an electric load value more accurately so as not to purchase relatively expensive commercial power from a power company when possible.

The present invention solves the problems of response performance substantially belonging to such a conventional generator, and another object thereof is to provide the generator control system of exerting control so that the electric load of the household electrical appliances substantially corresponds to output of the generator.

Further, the present invention also provides a power control system, a power control method, a program and a record medium of controlling apparatuses to effectively use surplus power for the apparatuses in a household without selling it to an outside power company when possible.

SUMMARY OF THE INVENTION

The $1^{st}$ aspect of the present invention is a generator control system comprising:
- an apparatus operation detecting portion of detecting a predetermined setting parameter of a apparatus; and
- a generator control portion of outputting a control signal to a generator according to the predetermined setting parameter when said apparatus operation detecting portion detects a change of the predetermined setting parameter of the apparatus.

The $2^{nd}$ aspect of the present invention is the generator control system according to the $1^{st}$ aspect of the present invention, comprising:
- a generating capacity measuring portion of measuring a generating capacity of the generator;
- an apparatus power consumption measuring portion of measuring power consumption of the apparatus; and
- an apparatus operation control portion of controlling the apparatus irrespective of a value of the predetermined setting parameter of the apparatus so that an increasing amount of the power consumption of the apparatus obtained from said apparatus power consumption measuring portion should correspond to the increasing amount of the generating capacity of the generator obtained from said generating capacity measuring portion.

The $3^{rd}$ aspect of the present invention is the generator control system according to the $2^{nd}$ aspect of the present invention, wherein the change of the predetermined setting parameter of the apparatus includes a change from a stopped state to an operating state.

The $4^{th}$ aspect of the present invention is the generator control system according to the $2^{nd}$ aspect of the present invention, wherein said generator control portion outputs a control signal to the generator based on data held in advance indicating a relation between the predetermined setting parameter of the apparatus and the power consumption of the apparatus.

The $5^{th}$ aspect of the present invention is a generator control system according to the $1^{st}$ aspect of the present invention, comprising:
- a generating capacity measuring portion of measuring a generating capacity of the generator;
- an apparatus power consumption estimating portion of predictively calculating power consumption of the apparatus at least from the predetermined setting parameter of the apparatus; and
- an apparatus operation control portion of controlling the apparatus irrespective of a value of the setting parameter of the apparatus by using estimated power consumption of the apparatus obtained from said apparatus power consumption estimating portion so that an increasing amount of the power consumption of the apparatus should correspond to the increasing amount of the generating capacity of the generator obtained from said generating capacity measuring portion, wherein
- said generator control portion of outputting a control signal to the generator according to the power consumption of the apparatus calculated by said apparatus power consumption estimating portion corresponding to the changed setting parameter when said apparatus operation detecting portion detects a change of the setting parameter of the apparatus.

The $6^{th}$ aspect of the present invention is the generator control system according to the $5^{th}$ aspect of the present invention, wherein the change of the set state of the apparatus includes a change from a stopped state to an operating state.

The $7^{th}$ aspect of the present invention is the generator control system according to the $5^{th}$ aspect of the present invention, wherein said generator control portion outputs a control signal to the generator based on data held in advance indicating a relation between the predetermined setting parameter of the apparatus and the estimated power consumption of the apparatus.

The $8^{th}$ aspect of the present invention is the generator control system according to the $5^{th}$ aspect of the present invention, wherein the system further comprises an environment measuring portion of measuring environment information on an environment of operating the apparatus, and said apparatus power consumption estimating portion predictively calculates the power consumption of the apparatus based on the predetermined setting parameter of the apparatus and the environment information obtained from said environment measuring portion.

The $9^{th}$ aspect of the present invention is the generator control system according to the $5^{th}$ aspect of the present invention, comprising an environment measuring portion of measuring environment information on an environment of operating the apparatus, and an apparatus power consumption measuring portion of measuring power consumption of the apparatus,
wherein said apparatus power consumption estimating portion gathers information from the apparatus power consumption measuring portion, said environment measuring portion and said apparatus operation control portion so as to modify a power consumption estimation model performed by itself at any time.

The $10^{th}$ aspect of the present invention is the generator control system according to the $9^{th}$ aspect of the present invention, wherein, in the case where the generator has enough generating capacity compared to the power consumption measured by said apparatus power consumption measuring portion, said apparatus operation control portion controls the apparatus by using the power consumption of the apparatus obtained from said apparatus power consumption estimating portion and ignoring the setting parameter of the apparatus so that an increasing amount of the power consumption of the apparatus should correspond to the increasing amount of the generating capacity of the generator obtained from said generating capacity measuring portion.

The $11^{th}$ aspect of the present invention is the generator control system according to the $2^{nd}$ or the $5^{th}$ aspect of the present invention, wherein the apparatus operation control portion exerts control to reduce the power consumption of the apparatus in the case where the generating capacity of the generator obtained from said generating capacity measuring portion exceeds a rated value.

The $12^{th}$ aspect of the present invention is the generator control system according to the $2^{nd}$ or the $5^{th}$ aspect of the present invention, wherein, in the case where there are a plurality of the apparatus, said apparatus operation control portion exerts control to keep priorities in reducing the power consumption of the apparatuses and reduce the power consumption of the apparatuses according to the priorities.

The $13^{th}$ aspect of the present invention is the generator control system according to the $12^{th}$ aspect of the present invention, comprising a priority setting portion of having the priorities in reducing the power consumption of the apparatuses set by a user.

The $14^{th}$ aspect of the present invention is the generator control system according to the $2^{nd}$ or the $5^{th}$ aspect of the present invention, comprising an apparatus control selecting portion of selecting or deselecting whether or not said apparatus operation control portion controls the apparatus.

The 15th aspect of the present invention is the generator control system according to the 2nd or the 5th aspect of the present invention, comprising a power information display portion of displaying the apparatus controlled by said apparatus operation control portion, the power consumption of the apparatus obtained from said apparatus power consumption measuring portion or said apparatus power consumption estimating portion and the generating capacity of the generator obtained from said generating capacity measuring portion.

The 16th aspect of the present invention is the generator control system according to the 2nd or the 5th aspect of the present invention, wherein the apparatus is a domestic air conditioner, and said apparatus operation control portion controls at least one of preset temperature, air volume and air cleaning functions of the domestic air conditioner a plurality of times.

The 17th aspect of the present invention is the generator control system according to the 2nd or the 5th aspect of the present invention, wherein the apparatus is illumination having an illumination adjustment function.

The 18th aspect of the present invention is a program of the generator control system according to the 2nd aspect of the present invention of allowing a computer to function as an apparatus operation control portion of controlling the apparatus irrespective of a value of the predetermined setting parameter of the apparatus so that an increasing amount of the power consumption of the apparatus obtained from said apparatus power consumption measuring portion should correspond to the increasing amount of the generating capacity of the generator obtained from said generating capacity measuring portion.

The 19th aspect of the present invention is a program of the generator control system according to the 5th aspect of the present invention of allowing a computer to function as an apparatus power consumption estimating portion of predictively calculating power consumption of the apparatus at least from the predetermined setting parameter of the apparatus; and an apparatus operation control portion of controlling the apparatus irrespective of a value of the setting parameter of the apparatus by using estimated power consumption of the apparatus obtained from said apparatus power consumption estimating portion so that an increasing amount of the power consumption of the apparatus should correspond to the increasing amount of the generating capacity of the generator obtained from said generating capacity measuring portion.

The 20th aspect of the present invention is a record medium recording the program according to the 18th or the 19th aspect of the present invention, which is processable by the computer.

The 21st aspect of the present invention is a generator control method comprising:

an apparatus operation detecting step of detecting a predetermined setting parameter of an apparatus; and a generator control step of, if said apparatus operation detecting step detects a change of the predetermined setting parameter of the apparatus, outputting a control signal to a generator according to the predetermined setting parameter.

The 22nd aspect of the present invention is a generator control method according to the 21st aspect of the present invention, comprising:

a generating capacity measuring step of measuring a generating capacity of the generator;

an apparatus power consumption measuring step of measuring power consumption of the apparatus; and an apparatus operation control portion of controlling the apparatus irrespective of a value of the predetermined setting parameter of the apparatus so that an increasing amount of the power consumption of the apparatus obtained from said apparatus power consumption measuring step should correspond to the increasing amount of the generating capacity of the generator obtained from said generating capacity measuring step.

The 23rd aspect of the present invention is a generator control method according to the 21st aspect of the present invention, comprising:

a generating capacity measuring step of measuring a generating capacity of the generator;

an apparatus power consumption estimating step of predictively calculating power consumption of the apparatus at least from the predetermined setting parameter of the apparatus; and an apparatus operation control step of controlling the apparatus irrespective of a value of the setting parameter of the apparatus by using estimated power consumption of the apparatus obtained from said apparatus power consumption estimating step so that an increasing amount of the power consumption of the apparatus should correspond to the increasing amount of the generating capacity of the generator obtained from said generating capacity measuring step, wherein said generator control step of, if said apparatus operation detecting step detects a change of the setting parameter of the apparatus, outputting a control signal to the generator according to the power consumption of the apparatus calculated by said apparatus power consumption estimating step corresponding to the changed setting parameter.

The 24th aspect of the present invention is a power control system to be used for an electrical system connecting to a generator and a plurality of apparatuses having power supplied thereto by the generator, the power control system comprising:

a generating capacity measuring portion of measuring a generating capacity of the generator;

a master power measuring portion of measuring power consumption of the plurality of apparatuses; and a specific apparatus control portion of, in the case where surplus power is generated as a difference between the generating capacity of the generator measured by said generating capacity measuring portion and all the power consumption of the apparatuses in operation measured by said master power measuring portion, operating all or a part of a function of a specific apparatus preset as the apparatus operable by the surplus power out of the plurality of apparatuses.

The 25th aspect of the present invention is the power control system according to the 24th aspect of the present invention, comprising a specific apparatus setting portion of presetting the specific apparatus.

The 26th aspect of the present invention is the power control system according to the 25th aspect of the present invention, wherein:

said specific apparatus setting portion sets priorities in operating the specific apparatus in the case where the surplus power is generated; and said specific apparatus control portion operates the specific apparatus according to the priorities.

The 27th aspect of the present invention is the power control system according to the 25th aspect of the present invention, wherein:

said specific apparatus setting portion obtains the power consumption from the specific apparatus in the case of operating the function of the specific apparatus; and said specific apparatus control portion operates the specific apparatus according to the power consumption obtained in the case where the surplus power is generated.

The 28th aspect of the present invention is the power control system according to the 24th aspect of the present invention, wherein:

the specific apparatus is an apparatus comprising a function which causes no problem to a user even if all or a part of the functions of the specific apparatus stops when the power is on.

The 29th aspect of the present invention is the power control system according to the 28th aspect of the present invention, wherein:

all or a part of the functions of the specific apparatus is garbage agitating function of a garbage disposal unit, a ventilating function of a ventilator mounted under floor or under the roof, a hot water heat-retaining function of a water-storing hydronic heating toilet seat, a watering function of an automatic sill cock or a battery-driven apparatus charging function.

The 30th aspect of the present invention is a power control method to be used for an electrical system connecting to a generator and a plurality of apparatuses having power supplied thereto by the generator, the method comprising:

a generating capacity measuring step of measuring a generating capacity of the generator;

a master power measuring step of measuring power consumption of the plurality of apparatuses;

a specific apparatus setting step of setting the specific apparatus operable by surplus power as a difference between the generating capacity of the generator measured by said generating capacity measuring step and all the power consumption of the apparatuses in operation measured by said master power measuring step; and a specific apparatus control step of operating all or a part of the function of the specific apparatus in the case where the surplus power is generated.

The 31st aspect of the present invention is a program of causing a computer to function as a specific apparatus control portion of, in the case where surplus power is generated as a difference between the generating capacity of the generator measured by said generating capacity measuring portion and all the power consumption of the apparatuses in operation measured by said master power measuring portion according to the 24th aspect of the present invention, operating all or a part of the function of the specific apparatus preset as the apparatus operable by said surplus power out of the plurality of apparatuses.

The 32nd aspect of the present invention is a record medium recording the program of the 31st aspect of the present invention, which is processable by a computer.

The present invention provides a generator control system, a generator control method, a program and a record excellent in responsiveness as a response command to the electric load fluctuation of the household electrical appliances and capable of outputting a command value by estimating an electric load value more accurately so as to control the output of the generator in response to the change of settings of the electric power unit.

Since it is controlled to correspond an increasing amount of the power consumption of the apparatus with the increasing amount of the generating capacity of the generator, the present invention can also provide the generator control system, generator control method, program and record medium capable of keeping from purchasing the commercial power when possible and exploiting a merit of a running cost reduced by the introduction of the generator.

Further, since the specific apparatus for the surplus power is operated when the surplus power is generated, the present invention can also provide the power control system, power control method, program and record medium capable of keeping from selling the surplus power to the outside power company when possible and effectively using it for the apparatuses in the household so as to maximize the merit of utility charges of the household reduced by the introduction of the generator.

BRIEF DESCRIPTION OF THE DRAWINGS

FIG. 7 is a block diagram of a power control system according to the sixth embodiment of the present invention.

FIG. 8 shows a specific apparatus control table generated by the specific apparatus setting portion 370.

DESCRIPTION OF SYMBOLS

Figure 1:
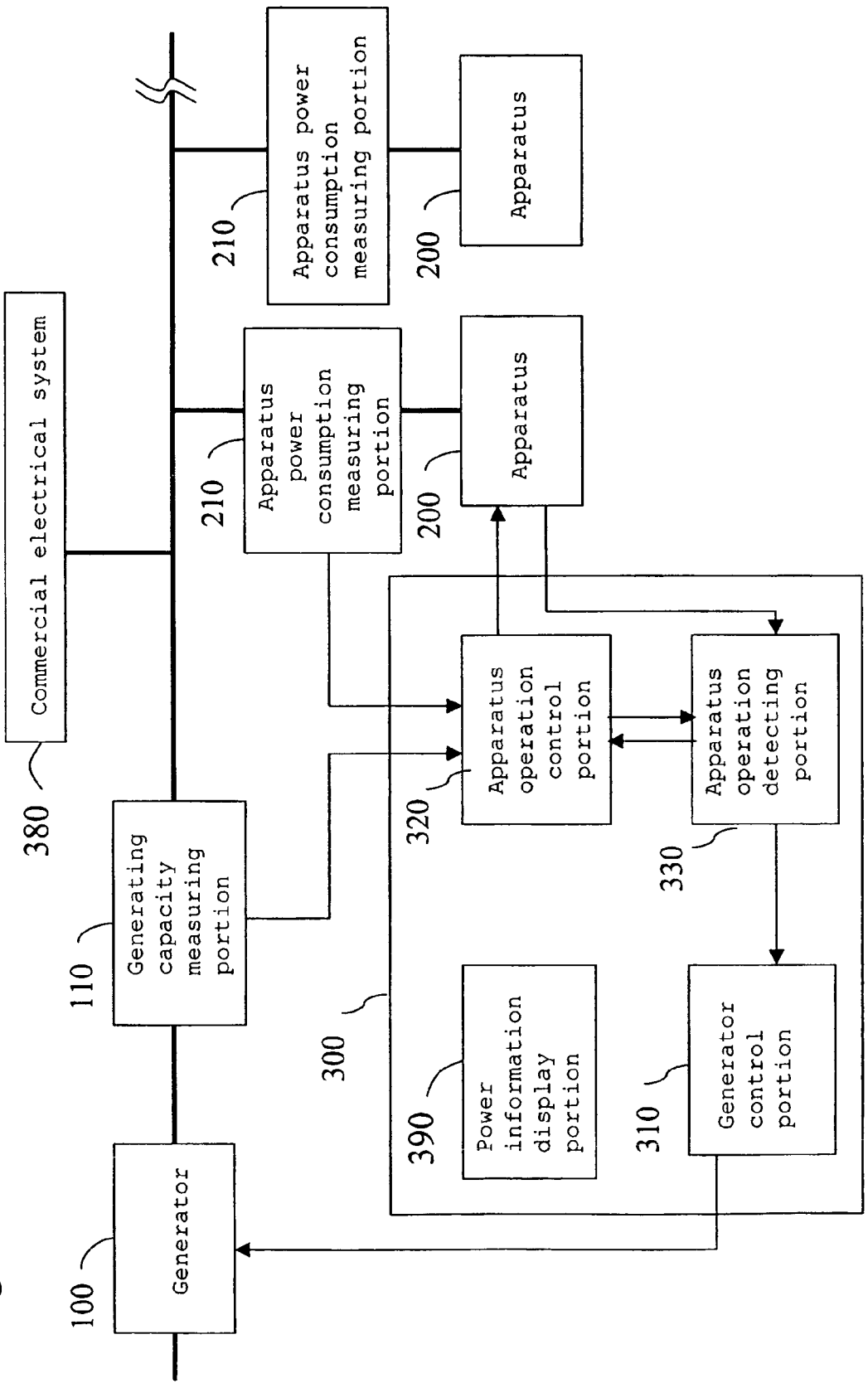
FIG. 1 is a block diagram of a generator control system according to a first embodiment of the present invention.

100 Generator
110 Generating capacity measuring portion
200 Apparatuses
210 Apparatus power consumption measuring portion
260 Environment measuring portion
300 Control portion
310 Generator control portion
320 Apparatus operation control portion
330 Apparatus operation detecting portion
340 Apparatus power consumption estimating portion
350 Communication interface
360 Specific apparatus control portion
370 Specific apparatus setting portion

PREFERRED EMBODIMENTS OF THE INVENTION

First Embodiment

FIG. 1 is a block diagram of a generator control system according to this embodiment.

In FIG. 1, a generator 100 is comprised of a fuel battery, a gas turbine, a gas engine and so on. A generating capacity measuring portion 110 is an apparatus which is mounted on an output line of the generator 100 and measures a generating capacity of apparatuses 100. The generating capacity in this case refers to instantaneous power generated by the generator 100.

The apparatuses 200 are general apparatuses used in a household such as an air conditioner, heating apparatuses and lighting, and an apparatus power consumption measuring portion 210 is an apparatus of measuring power consumption of the apparatuses 200. There are pluralities of the apparatuses 200 and apparatus power consumption measuring portions 210 respectively. Power sensors and so on are used as both the generating capacity measuring portion 110 and apparatus power consumption measuring portions 210.

The generating capacity of the generator 100 is supplied to the apparatuses 200 via a distribution board and a power line for household use so as to be consumed.

The generator control system according to this embodiment is also connected to a commercial electrical system 380 of supplying power from a power company as shown in FIG. 1, and the power supplied from the commercial electrical system 380 is also supplied to the apparatuses 200 via the distribution board and power line for household use so as to be consumed.

A control portion 300 comprises a generator control portion 310, an apparatus operation control portion 320, an apparatus operation detecting portion 330 and a power information display portion 390. And the control portion 300 is physically comprised of a CPU, a memory and a communication interface.

The generator control portion 310 has the communication interface of connecting to communication media such as RS-232C, a private line, a radio and a power line, and is connected to the generator 100 via the communication media. The generator control portion 310 is an apparatus of creating and sending a control signal to instruct the generator 100 to start and stop or change its output.

The apparatus operation control portion 320 is an apparatus of controlling the apparatuses 200, and is connected to the generating capacity measuring portion 110, the apparatuses 200 and the apparatus power consumption measuring portions 210 via the communication media such as the private line, radio and power line. When computing the generating capacity measured by the generating capacity measuring portion 110 in the apparatus operation control portion 320, AD conversion may be performed either by the generating capacity measuring portion 110 or by the apparatus operation control portion 320.

Likewise, when computing the power consumption of the apparatuses 200 measured by the apparatus power consumption measuring portions 210 in the apparatus operation control portion 320, the AD conversion may be performed either by the apparatus power consumption measuring portions 210 or by the apparatus operation control portion 320. The apparatus operation control portion 320 is an apparatus of creating and sending a control signal to start and stop or change settings of the apparatuses 200.

The apparatus operation detecting portion 330 is connected to the apparatuses 200 via the communication media such as the RS-232C, private line, radio and power line, and detects a set state of the apparatuses 200. In the case of the air conditioner for instance, the set state is a setting parameter of air conditioning, heating, temperature or breeze. To obtain the set state or setting parameter of the apparatuses 200, there are methods to be used, such as obtaining the set state by having the apparatus operation detecting portion 330 periodically submit a request of obtaining the set state to the apparatuses 200, having the apparatuses 200 autonomously notify the apparatus operation detecting portion 330 upon a change of the set state of the apparatuses 200, or in the case where the apparatuses 200 have their set state changed by a user remote control, having the apparatus operation detecting portion obtain the set state by intercepting the remote control signal.

The apparatus operation control portion 320 and apparatus operation detecting portion 330 share the set state information on the apparatuses 200. In the case where the apparatus operation detecting portion 330 cannot directly obtain the set state of the apparatuses 200, it is also possible to obtain a current control state sent to the apparatuses 200 from the apparatus operation control portion 320 and recognize the set state of the apparatuses 200.

The power information display portion 390 is an apparatus of presenting control information understandably to a user through an interface screen, the control information including being under energy-saving control, operation condition of the apparatuses 200 under the control, temporal transition of an actual measurement and an estimated value of the power consumption of the apparatuses 200, and a projection of power cost reduced by the control.

Next, operation of this embodiment of the above configuration will be described. Here, the case where the apparatus 200 is an inverter air conditioner (hereafter, described as an air conditioner 200) will be described.

The generator 100 is in operation with a constant generating capacity. The apparatuses 200 other than the air conditioner 200 are in operation with the generating capacity supplied by the generator 100, and no commercial power is supplied from the commercial electrical system 380.

Thus, if the user turns on the air conditioner 200 in a state in which the air conditioner 200 is off while the generator 100 is in operation with the constant generating capacity, the apparatus operation detecting portion 330 detects the set state or setting parameter. And the apparatus operation detecting portion 330 sends to the generator control portion 310 the information that the air conditioner 200 was turned on with that setting parameter. Upon receiving it, the generator control portion 310 outputs to the generator 100 a control signal of increasing the generating capacity of the generator 100 to a maximum output for instance.

Upon receiving the control signal from the generator control portion 310, the generator 100 starts the operation, according to the control signal, to increase the generating capacity to the maximum output for instance. For the generator 100 to increase the output, however, it generally requires a few minutes for ordering. Therefore, the apparatus operation control portion 320 monitors an increased portion of the generating capacity of the generator 100 obtained from the generating capacity measuring portion 110, and controls the operation of the air conditioner 200 to match the power consumption of the air conditioner 200 to the increased portion of the generating capacity.

To be more precise, in the case where the air conditioner 200 is turned on in the set state (setting parameters) of an operation mode "air conditioning," set temperature "25° C." and capacity "strong" for instance, the apparatus operation control portion 320 ignores the set state (setting parameters) and forcibly controls the air conditioner 200 such as the "air conditioning," the set temperature "27° C." and the capacity "slight" when the output of the generator 100 starts increasing so that an increasing amount of the power consumption will not exceed the increasing amount of the generating capacity of the generator 100.

Thereafter, the apparatus operation control portion 320 controls the air conditioner 200 to gradually come closer to the set temperature "25° C." and the capacity "strong" while monitoring the power consumption of the air conditioner 200 obtained from the apparatus power consumption measuring portion 210 and keeping from exceeding the generating capacity of the generator 100.

As described above, when the generator control system of the first embodiment detects the change of settings of the apparatus side such as the air conditioner 200 by the user, it controls the output of the generator 100 according to the change of settings. That is, as it is controlled by the change of settings of the apparatus side such as the air conditioner 200, it is possible to provide the system that is excellent in responsiveness as a response command to the load fluctuation of the appliances and capable of outputting a command value by estimating an electric load value more accurately.

The control of such an apparatus operation control portion 320 will be described in detail below.

In the case where the air conditioner 200 is turned on in the set state (setting parameters) of an operation mode "air conditioning," the set temperature "25° C." and the capacity "strong," it requires a few minutes for ordering before the generating capacity becomes the maximum output if the generator 100 starts the operation, according to the control signal from the generator control portion 310, to increase the generating capacity to the maximum output for instance.

Therefore, for a while after the generator 100 started the operation to increase the output, a total of the power consumption of the air conditioner 200 and the apparatuses 200 other than the air conditioner 200 exceeds the generating capacity of the generator 100 so that the power to be supplied to the air conditioner 200 and so on runs short. Therefore, the commercial power is also supplied to the air conditioner 200 and so on from the commercial electrical system 380 to make up for this shortage of power.

The generating capacity measuring portion 110 monitors the generating capacity of the generator 100, and the apparatus power consumption measuring portion 210 measures the power consumption of the air conditioner 200 and so on. The apparatus operation control portion 320 and so on monitors the increased portion of the power consumption of the air conditioner 200 measured by the generating capacity measuring portion 110 and the increased portion of the generating capacity of the generator 100 so as to exert control of the following (1) to (3).

(1) Control in the case where the increased portion of the power consumption of the air conditioner 200, after starting the operation of the air conditioner 200, exceeds the increased portion of the generating capacity of the generator 100

In the case where the increased portion of the power consumption of the air conditioner 200 measured by the apparatus power consumption measuring portions 210 exceeds the increased portion of the generating capacity of the generator 100, the apparatus operation control portion 320 exerts control to reduce the increased portion of the power consumption of the air conditioner 200.

To be more specific, in the case where the increased portion of the power consumption of the air conditioner 200 exceeds the increased portion of the generating capacity of the generator 100, the apparatus operation control portion 320 increases the set temperature of the set state (setting parameters) of the air conditioner 200 by 1° C. until the increased portion of the power consumption of the air conditioner 200 no longer exceeds the increased portion of the generating capacity of the generator 100. And when the increased portion of the power consumption of the air conditioner 200 no longer exceeds the increased portion of the generating capacity of the generator 100, the air conditioner 200 can be operated only by the generating capacity of the generator 100 so that the supply of the commercial power from the commercial electrical system 380 is stopped.

For instance, in the case where the increased portion of the power consumption of the air conditioner 200 exceeds the increased portion of the generating capacity of the generator 100 when the air conditioner 200 is turned on in the set state (setting parameters) of the operation mode "air conditioning," the set temperature "25° C." and the capacity "strong," the apparatus operation control portion 320 controls the set state (setting parameters) of the air conditioner 200 so as to decrease the power consumption of the air conditioner 200. For example, it controls to increase the set temperature of the air conditioner 200 by 1° C. or changing it to "26° C." The air conditioner 200 is operated by changing the set temperature to "26° C." according to the control of the apparatus operation control portion 320. In the case where the increased portion of the power consumption of the air conditioner 200 exceeds the increased portion of the generating capacity of the generator 100 even after changing the set temperature of the air conditioner 200 to "26° C.," the apparatus operation control portion 320 controls the set state (setting parameters) of the air conditioner 200 so as to further decrease the power consumption of the air conditioner 200. For example, it controls to increase the set temperature of the air conditioner 200 by 1° C. or changing it to "27° C."

As the set temperature of the air conditioner 200 is changed from "25° C." to "27° C.," the increased portion of the power consumption of the air conditioner 200 is reduced, and the increased portion of the power consumption of the air conditioner 200 becomes less than the increased portion of the generating capacity of the generator 100. Thus, in this case, the air conditioner 200 can be operated only by the generating capacity of the generator 100 so that the supply of the commercial power from the commercial electrical system 380 is stopped.

(2) Control in the case where the increased portion of the generating capacity of the generator 100, after starting the operation of the air conditioner 200, exceeds the increased portion of the power consumption of the air conditioner 200 by a predetermined value or more In the case where the increased portion of the generating capacity of the generator 100 exceeds the increased portion of the power consumption of the air conditioner 200 by a predetermined value or more, control is exerted to increase the increased portion of the power consumption of the air conditioner 200.

To be more specific, in the case where the increased portion of the generating capacity of the generator 100 exceeds the increased portion of the power consumption of the air conditioner 200 by the predetermined value or more, the set temperature of the set state (setting parameters) of the air conditioner 200 is reduced by 1° C. until the increased portion of the generating capacity of the generator 100 no longer exceeds the increased portion of the power consumption of the air conditioner 200 by the predetermined value or more.

For instance, while the air conditioner 200 is operated in the set state (setting parameters) of the operation mode "air conditioning," the set temperature "27° C." and the capacity "strong," the generating capacity of the generator 100 gradually increases over time. In the case where the increased portion of the generating capacity of the generator 100 exceeds the increased portion of the power consumption of the air conditioner 200 by the predetermined value or more, since the generating capacity of the generator 100 exceeds the power consumption of the air conditioner 200, the apparatus operation control portion 320 controls the air conditioner 200 to increase the power consumption and to set the temperature closer to the one which is set by the users. For example, the apparatus operation control portion 320 controls the air conditioner 200 to change the set temperature of the set state (setting parameters) of the air conditioner 200 from "27° C." to "26° C." The air conditioner 200 operates by setting the set temperature of the set state (setting parameters) of the air conditioner 200 to "26° C." according to the control of the apparatus operation control portion 320.

As the set temperature of the set state (setting parameters) of the air conditioner 200 is changed from "27° C." to "26°

C.," the increased portion of the power consumption of the air conditioner 200 is increased. However, the generating capacity of the generator 100 has also increased because some time has elapsed since the operation to increase the generating capacity to the maximum output was started. Therefore, the increased portion of the power consumption of the air conditioner 200 is smaller than the increased portion of the generating capacity of the generator 100. Thus, the generator 100 can supply the power to be consumed by the air conditioner 200 and all the apparatuses 200 other than the air conditioner 200. Therefore, the state of having no commercial power supplied from the commercial electrical system 380 is kept.

In the case where the set temperature of the set state (setting parameters) of the air conditioner 200 is changed from "27° C." to "26° C.," however, there may be the cases where the increased portion of the power consumption of the air conditioner 200 exceeds the increased portion of the generating capacity of the generator 100 unlike the above description. In such cases, the power to be consumed by the air conditioner 200 and all the apparatuses 200 other than the air conditioner 200 cannot be supplied only by the generator 100, and so the commercial power equivalent to the shortage is supplied to the air conditioner 200 and so on from the commercial electrical system 380. And in this case, the apparatus operation control portion 320 exerts control as described in (1). To be more specific, the apparatus operation control portion 320 controls the air conditioner 200 to return the set temperature of the set state (setting parameters) of the air conditioner 200 from "26° C." to "27° C." The air conditioner 200 complies with the control of the apparatus operation control portion 320 and operates by setting the set temperature of the set state (setting parameters) of the air conditioner 200 to "27° C." As the set temperature of the set state (setting parameters) of the air conditioner 200 is returned from "26° C." to "27° C.," the increased portion of the power consumption of the air conditioner 200 is reduced. Therefore, the increased portion of the power consumption of the air conditioner 200 becomes smaller than the increased portion of the generating capacity of the generator 100. Thus, the generator 100 can supply the power to be consumed by the air conditioner 200 and all the apparatuses 200 other than the air conditioner 200, and so the supply of the commercial power from the commercial electrical system 380 is stopped.

In the case where the increased portion of the generating capacity of the generator 100 exceeds the increased portion of the power consumption of the air conditioner 200 by the predetermined value or more, there is a possibility that the increased portion of the generating capacity of the generator 100 may remain as-is in the state of exceeding the increased portion of the power consumption of the air conditioner 200 by the predetermined value or more even after changing the set temperature of the set state (setting parameters) of the air conditioner 200 from "27° C." to "26° C." In such cases, control should be exerted to further reduce the set temperature of the set state (setting parameters) of the air conditioner 200 by 1° C. To be more specific, control should be exerted to further reduce the set temperature of the set state (setting parameters) of the power consumption of the air conditioner 200 by 1° C. until the increased portion of the generating capacity of the generator 100 no longer exceeds the increased portion of the power consumption of the air conditioner 200 by the predetermined value or more.

(3) Control in the case where the set state (setting parameters) of the air conditioner 200 is within a target set state (setting parameters)

Furthermore, in the case where the set state of the air conditioner 200 corresponds to the one which users set and where the set temperature of the setting parameters becomes a target set temperature "25° C." while the apparatus operation control portion 320 is exerting the control, the apparatus operation detecting portion 330 detects it and notifies the generator control portion 310 thereof. The generator control portion 310 controls the generator 100 for the output to perform the constant operation with the generating capacity as of the notification from the apparatus operation detecting portion 330. The generator 100 starts the rated operation according to the control from the generator control portion 310.

The apparatus operation control portion 320 and so on can operate the air conditioner 200, by exerting the control in (1) to (3), without having the commercial power from the commercial electrical system 380 when possible.

If the control is exerted, the air conditioner 200 is operated in the set state (setting parameters) different from the set state (setting parameters) actually set by the user and so there may be inconvenience for the user.

Therefore, the power information display portion 390 presents the control information understandably to the user through the interface screen, the control information including being under the energy-saving control (state of exerting the above control), operation condition of the apparatuses 200 under the control, the actual measurement of the power consumption of the apparatuses 200, and a projection of power cost reduced by the control.

Thus, the user can set energy-saving operation of the apparatuses 200 according to time and a lifestyle. Although there may be a feeling of inconvenience, the information on a current operational status of the apparatuses 200 is disclosed so as to reduce the user's discomfort at the control.

According to the first embodiment as described above, in the case where the user changes the setting parameters of the apparatuses 200, the apparatus operation control portion 320 controls controllable factors of the apparatuses 200 so that the power consumption of the apparatuses 200 obtained from the apparatus power consumption measuring portions 210 will not exceed the increasing generating capacity of the generator 100 obtained from the generating capacity measuring portion 110. Therefore, it is possible to provide the generator control system capable of reducing purchase of the commercial power for rapid increase of the power consumption of the apparatuses 200 and exploiting a cost merit of the introduction of the generator.

It is desirable that the power consumption of the apparatuses 200 should not exceed the increasing generating capacity of the generator 100. However, the design may allow such exceeding to some extent.

Second Embodiment

Next, a second embodiment will be described. According to the first embodiment, there are the cases where, due to the control of the apparatus operation control portion 320, the power consumption of the apparatus 200 temporarily exceeds the generating capacity of the generator 100 so that it is necessary to have the commercial power temporarily supplied from the commercial electrical system 380. As opposed to this, the second embodiment will describe the generator control system which estimates the power consumption of the air conditioner 200 and controls the set state (setting parameters) of the apparatuses 200 by using the result of estimation so that the power consumption of the air conditioner 200 does not exceed the generating capacity of the generator 100 as much as it does in the first embodiment and so it is less likely than the first embodiment to have the commercial power supplied from the commercial electrical system 380.

Figure 2:
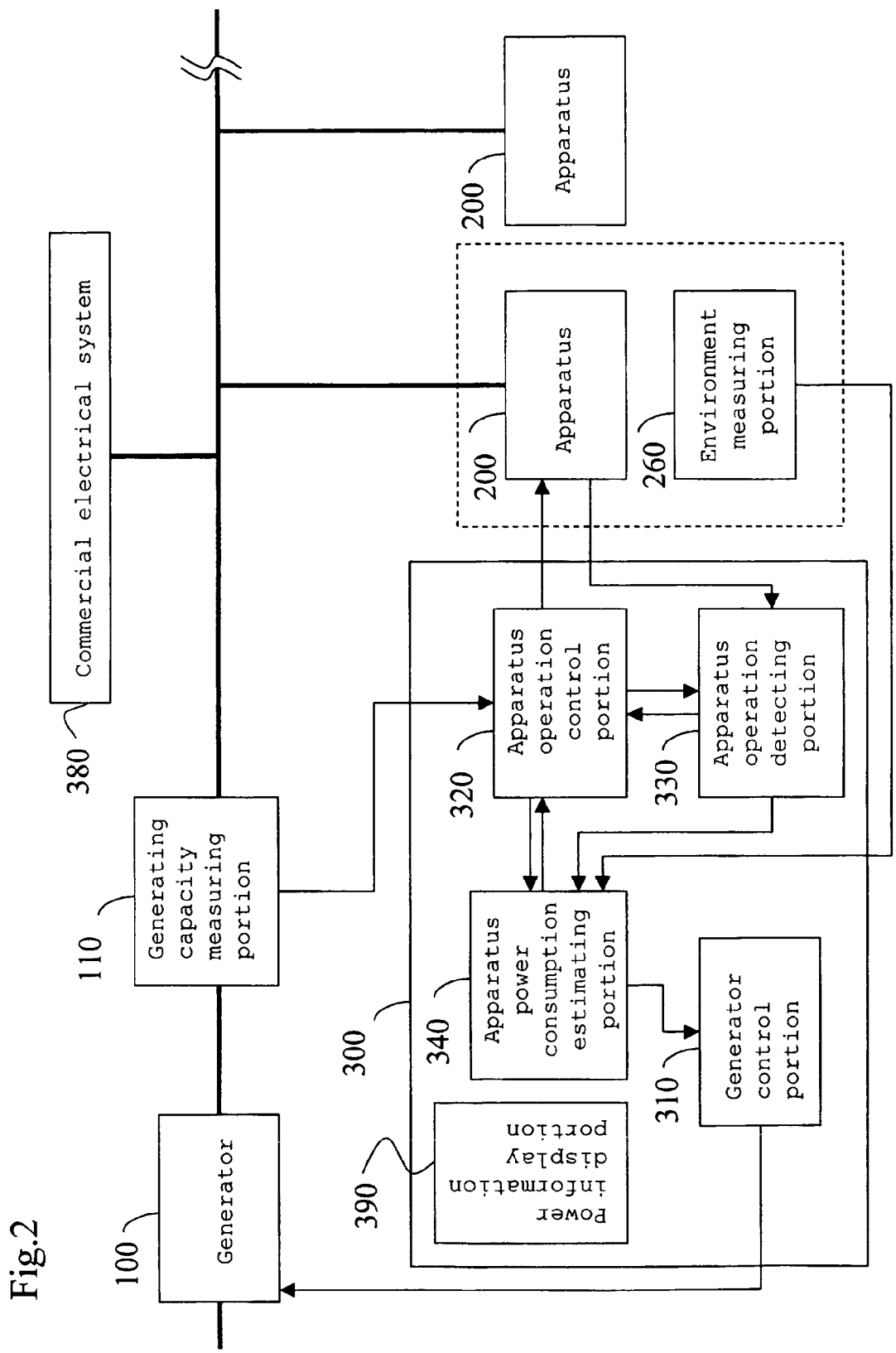
FIG. 2 is a block diagram of the generator control system according to a second embodiment of the present invention.

FIG. 2 is a block diagram of a generator control system according to this embodiment.

In FIG. 2, the apparatus power consumption measuring portions 210 do not exist as compared to the first embodiment, and a power consumption estimating portion 340 and an environment measuring portion 260 are provided instead.

The power consumption estimating portion 340 is an apparatus for estimating the power consumption of the air conditioner 200.

The environment measuring portion 260 is an apparatus for measuring the temperature, humidity, outside air temperature and so on in a room where the apparatuses 200 are set up. The environment measuring portion 260 may be the measuring portion built into the apparatuses 200. As the configuration is the same as that of the first embodiment otherwise, a description thereof will be omitted.

Next, the operation of this embodiment having the above configuration will be described.

Here, the case where the apparatus 200 is the inverter air conditioner (hereafter, described as the air conditioner 200) will be described.

If the user turns on the air conditioner 200 in the state in which the generator 100 is in operation with the constant generating capacity and the air conditioner 200 is off, the apparatus operation detecting portion 330 detects it and outputs the current set state of the air conditioner 200 to the power consumption estimating portion 340. Here, if the total of the power consumption of the air conditioner 200 and so on exceeds the generating capacity of the generator 100 while the user turns on the air conditioner 200 and before controls are executed on the air conditioner 200 as described below, the power to be supplied to the air conditioner 200 and so on runs short. Therefore, the commercial power is supplied from the commercial electrical system 380 to make up for the shortage.

The power consumption estimating portion 340 estimates the power consumption in the case of operating the air conditioner 200 in the set state. To be more precise, it obtains the outside air temperature and room temperature of a room having the air conditioner 200 installed therein from the environment measuring portion 260 and uses a power consumption estimation model such as a regression line (or a regression curve) of which variables are a difference between the set temperature and the outside air temperature, a difference between the set temperature and the room temperature and the capacity or a neural network of which inputs are the room temperature, outside air temperature, set temperature and capacity so as to perform the estimation.

To be more specific, the power consumption estimating portion 340 holds a control algorithm of determining control parameters (a fan rotation frequency and so on) of the air conditioner and a power consumption table on operating it with the determined control parameters. And the air conditioner control is simulated from the data on the outside air temperature and the temperature of the room having the air conditioner installed therein so as to estimate the power consumption at each moment.

There is another method of estimating it by using an interpolation function such as the neural network. To be more specific, in the case where the apparatus is the air conditioner, the power consumption at each moment is estimated by using the neural network having learned to output the power consumption by inputting environmental conditions (outside air temperature, room temperature) and the set temperature in advance.

The generator control portion 310 outputs the control signal to the generator 100 so that the power consumption of the apparatus 200 estimated by the power consumption estimating portion 340 will be a generating capacity target of the generator 100. In that case, the apparatus operation control portion 320 exerts control as follows.

If the generator 100 starts to increase the generating capacity according to the control signal from the generator control portion 310, the apparatus operation control portion 320 controls the apparatus 200 so that the power consumption of the air conditioner 200 will not exceed the generating capacity of the generator 100 obtained by the generating capacity measuring portion 110. For instance, if the air conditioner 200 is turned on and has the setting parameters set in the operation mode "air conditioning," the set temperature "25° C." and the capacity "strong," the apparatus operation control portion 320 has the air conditioner 200 operated at the set temperature "27° C." and the capacity "slight" at first.

Thus, when the control is exerted so that the set state (setting parameters) of the air conditioner 200 no longer exceeds the generating capacity of the generator 100, the air conditioner 200 can be operated only by the generating capacity of the generator 100 so that the supply of the commercial power from the commercial electrical system 380 is stopped.

And the apparatus operation control portion 320 monitors the generating capacity obtained from the generating capacity measuring portion 110, and gradually brings the air conditioner 200 closer to user settings. To be more precise, the power consumption in the case of virtually changing the set temperature and capacity to several different values is estimated by the apparatus power consumption estimating portion 340, and settings of the air conditioner 200 are switched in order from a combination having the smallest estimated value of the power consumption. For that purpose, various kinds of set states, that is, relations between combinations of the setting parameters and environment parameters to be measured and estimated power consumption corresponding to them are prepared as the data in advance. And the set state of the air conditioner 200 is sequentially switched by using the data.

To be more specific, the apparatus operation control portion 320 monitors the generating capacity obtained from the generating capacity measuring portion 110, and switches the set state (setting parameters) of the air conditioner 200 to the set state which is in a range the power consumption of the air conditioner 200 does not exceed the monitored generating capacity and which is closest to a target set state. If the air conditioner 200 is operated in the current set state (setting parameters) of the operation mode "air conditioning," the set temperature "27° C." and the capacity "slight," the apparatus operation control portion 320 uses the data indicating the relation between the combinations of the setting parameters and environment parameters to be measured and the estimated power consumption corresponding to them so as to exert the control to change the set state of the air conditioner 200 to the set state which does not exceed the monitored generating capacity and is closest to the target set state (setting parameters).

Here, as to determination of whether or not it is close to the target set state (setting parameters), it can be determined by using an evaluation function of seeking a distance between the set state (setting parameters) of the air conditioner 200 and the target set state (setting parameters). To be more specific, the evaluation function represents that, the smaller the value of the evaluation function becomes, the closer the distance between the set state (setting parameters) and the target set state (setting parameters) is and the closer the set state (setting parameters) of the air conditioner 200 and the target set state (setting parameters) are. As for such an evaluation function, in the case where the operation mode is "air conditioning" for instance, an evaluation function h (set temperature, capacity) as in formula 1 below may be used when having the set state (setting parameters) other than the operation mode represented by the combination of (set temperature, capacity).

$$h \text{ (set temperature, capacity)} = (A \times ((\text{set temperature}) - (\text{target set temperature}))^2 + B \times ((\text{capacity}) - (\text{target capacity}))^2)^{1/2} \quad \text{(Formula 1)}$$

However, A and B are constants, and they are determined in advance according to which of the set temperature and capacity is weighted in determination in order to determine whether or not the current set state (setting parameters) is close to the target set state (setting parameters). In the case of emphasizing the set temperature rather than the capacity, they should be set so that A becomes a large value and B becomes a small value. When calculating the evaluation function h (set temperature, capacity) according to formula 1, the set temperature is represented by the value indicating centigrade temperature, and the capacity is also represented by the values such as 1 as slight, 2 as weak, 3 as medium and 4 as strong.

When the generating capacity of the generator 100 increases over time and reaches the target generating capacity thereafter, the apparatus operation control portion 320 exerts the control so that the air conditioner 200 is operated in the target set state (setting parameters), that is, in the operation mode "air conditioning," the set temperature "25° C." and the capacity "strong."

If the control is exerted, the air conditioner 200 is operated in the set state (setting parameters) different from the set state (setting parameters) actually set by the user and so there may be inconvenience for the user.

Therefore, the power information display portion 390 presents the control information understandably to the user through the interface screen, the control information including being under the energy-saving control (the state of exerting the above control), operation condition of the apparatuses 200 under the control, temporal transition of the estimated value of the apparatuses 200, and projection of the power cost reduced by the control.

Thus, the user can set the energy-saving operation of the apparatuses 200 according to time and a lifestyle. Although there may be a feeling of inconvenience, the information on the current operational status of the apparatuses 200 is disclosed so as to reduce the user's discomfort at the control.

According to the second embodiment as described above, in the case where the user changes the set state of the apparatuses 200, the apparatus operation control portion 320 simulates the power consumption of the apparatus 200 and controls the apparatuses 200 for the power consumption not to exceed the increased portion of the generating capacity of the generator 100 which is obtained form the generating capacity measuring portion 110. Therefore, as in the first embodiment, it is possible to provide the generator control system capable of reducing purchase of the commercial power for rapid increase of the power consumption of the apparatuses 200 and exploiting a cost merit of the introduction of the generator, at a relatively low cost due to no need to install the power sensor of measuring the power consumption of the apparatus 200.

This embodiment is an essential configuration in a closed-system power supply system assuming no purchase of the commercial power.

According to the present invention, it is not essential to provide the environment measuring portion 260, and the power consumption may be estimated based on only one or more setting parameters of the apparatuses 200.

Third Embodiment

Next, a third embodiment will be described. The second embodiment described the case of estimating the power consumption of the apparatus 200 and controlling the set state (setting parameters) of the apparatus 200 by using the estimation result. In addition to the case of the second embodiment, the third embodiment describes the generator control system of further measuring the power consumption of the apparatus 200 and improving estimation accuracy of the power consumption of the apparatus 200 by using the measurement result.

Figure 3:
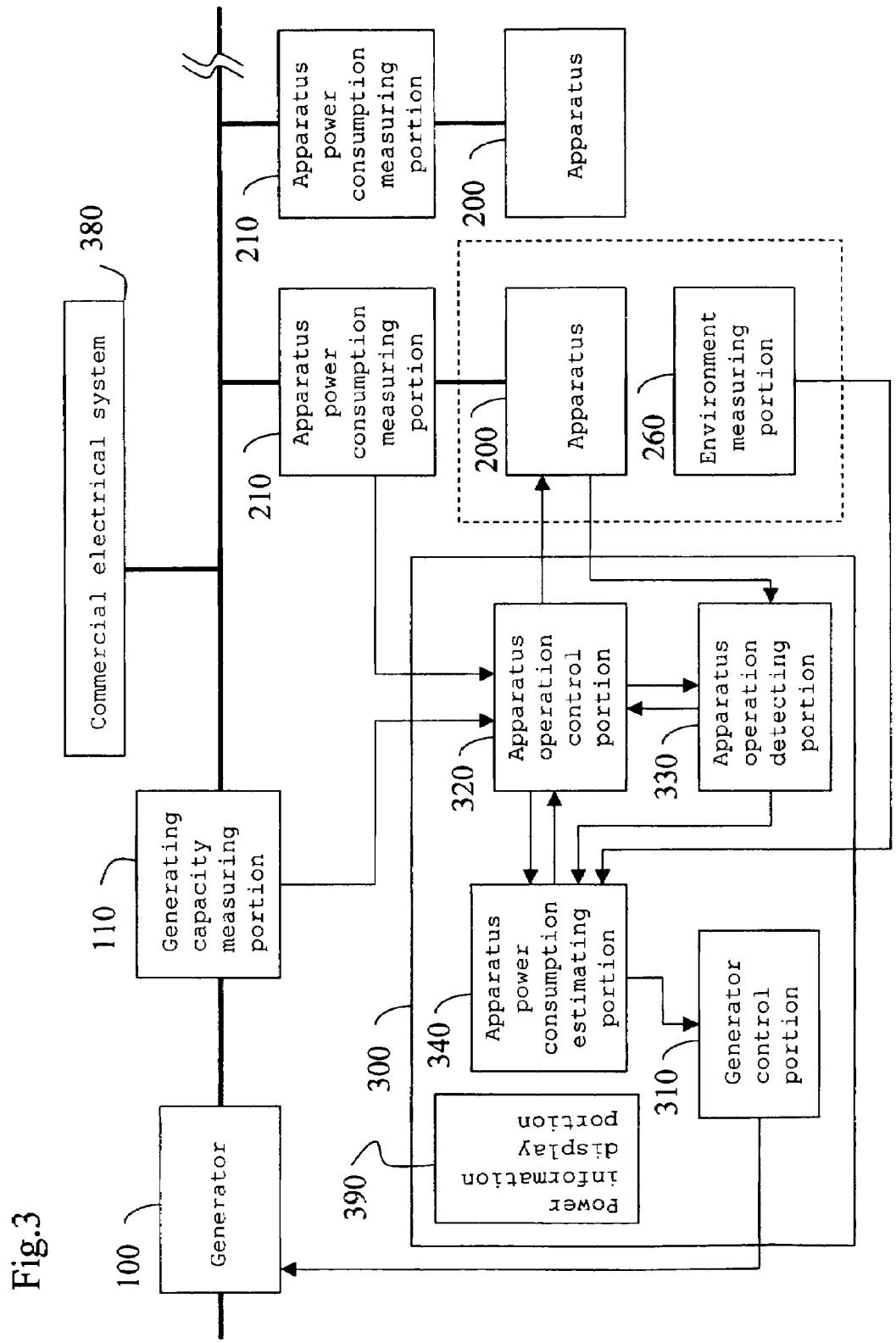
FIG. 3 is a block diagram of the generator control system according to a third embodiment of the present invention.

FIG. 3 is a block diagram of the generator control system according to this embodiment.

In FIG. 3, the apparatus power consumption measuring portions 210 exists as compared to the configuration in FIG. 2. As the configuration is the same as that of the second embodiment otherwise, a description thereof will be omitted.

Next, the operation of this embodiment having the above configuration will be described by centering on the differences from the second embodiment. Here, the case where the apparatus 200 is the inverter air conditioner (hereafter, described as the air conditioner 200) will be described.

If the user turns on the air conditioner 200 in the state in which the generator 100 is in operation with the constant generating capacity and the air conditioner 200 is off, the apparatus operation detecting portion 330 detects it and outputs the current set state of the air conditioner 200 to the power consumption estimating portion 340. The power consumption estimating portion 340 estimates the power consumption in the case of operating the air conditioner 200 in the set state. The power consumption estimation model described in the second embodiment is used for the estimation of the power consumption of the air conditioner 200.

The generator control portion 310 outputs the control signal to the generator 100 so as to render the power consumption of the air conditioner 200 estimated by the power consumption estimating portion 340 as the target generating capacity of the generator 100.

If the generator 100 starts to increase the generating capacity, the apparatus operation control portion 320 controls the apparatus 200 so that the power consumption of the air conditioner 200 obtained by the apparatus power consumption measuring portions 210 will not exceed the generating capacity of the generator 100 obtained by the generating capacity measuring portion 110. For instance, if the air conditioner 200 is turned on in the operation mode "air conditioning," the set temperature "25° C." and the capacity "strong," the apparatus operation control portion 320 has the air conditioner 200 operated at the set temperature "27° C." and the capacity "slight" at first.

And the apparatus operation control portion 320 monitors the generating capacity obtained from the generating capacity measuring portion 110 and the power consumption of the air conditioner 200 obtained by the apparatus power consumption measuring portions 210, and gradually brings the air conditioner 200 closer to the user settings in the case where there is enough generating capacity. To be more precise, in order to gradually bring the power consumption of the air conditioner 200 closer, the power consumption obtained by virtually changing the set temperature and capacity to several different values is estimated by the apparatus power consumption estimating portion 340, and the settings are switched in order from the combination having the smallest estimated value of the power consumption. To be more specific, various kinds of set states, that is, relations between combinations of the setting parameters and environment parameters to be measured and estimated power consumption corresponding to them are prepared as the data in advance as in the second embodiment. And the set state of the air conditioner 200 is sequentially switched by using the data. To be more specific, according to this embodiment, the power consumption measured by the apparatus power consumption measuring portions 210 is used to check whether the amount is small enough, and the air conditioner 200 is controlled by using the data prepared in advance.

The power consumption estimating portion 340 gathers information from the apparatus power consumption measuring portion 210, the environment measuring portion 260 and the apparatus operation control portion 320 so as to modify the power consumption estimation model at any time. To be more specific, in the case where the power consumption estimated by the power consumption estimating portion 340 is different from the actual power consumption of the air conditioner 200 measured by the apparatus power consumption measuring portion 210, the power consumption estimating portion 340 modifies the power consumption estimation model so that the estimated power consumption gets closer to the actual power consumption of the air conditioner 200. Thus, the power consumption of the air conditioner 200 measured by the apparatus power consumption measuring portion 210 in the third embodiment is used to improve accuracy of the estimation of the power consumption performed by the power consumption estimating portion 340.

In the case where the manufacturer manufacturing the generator control system is the same as the manufacturer manufacturing the air conditioner 200, it is possible to obtain detailed information on the power consumption of the air conditioner 200 in advance and use this information to estimate the power consumption with high accuracy. Therefore, in the case where the manufacturer manufacturing the generator control system is the same as the manufacturer manufacturing the air conditioner 200, it is not necessary to improve the estimation accuracy of the power consumption of the air conditioner 200 during the operation of the air conditioner 200, and it is possible to estimate the power consumption with high accuracy immediately after starting to use the generator control system. Therefore, the generator control system of the second embodiment should be used.

In the case where the manufacturer manufacturing the generator control system is different form the manufacturer manufacturing the air conditioner 200, it is difficult for the manufacturer manufacturing the generator control system to obtain the detailed information on the power consumption of the air conditioner 200 in advance. There are also the cases where the generator control system is to be built in as an adapter or something similar afterwards. In such cases, it is difficult even to identify the type and manufacturer of the air conditioner 200. Even in such cases, it is possible, only to estimate the power consumption with less accuracy immediately after starting to use the generator control system. However, by using the generator control system according to the third embodiment, the more the generator control system is used, the more accurately the power consumption can be estimated so as to control the air conditioner 200 accurately.

In the case where the power consumption of the air conditioner 200 of which set state (setting parameters) is controlled by the apparatus operation control portion 320 exceeds the generating capacity of the generator 100 due to insufficient accuracy of the estimated value of the power consumption of the air conditioner 200 given by the apparatus power consumption estimating portion 340, the commercial power is supplied from the commercial electrical system 380 so that the air conditioner 200 can be controlled normally.

If the above control is exerted, the air conditioner 200 is operated in the set state (setting parameters) different from the set state (setting parameters) actually set by the user and so there may be inconvenience for the user.

Therefore, the power information display portion 390 presents the control information understandably to the user through the interface screen, the control information including being under the energy-saving control (state of exerting the above control), operation condition of the apparatuses 200 under the control, temporal transition of an actual measurement and an estimated value of the power consumption of the apparatuses 200, and projection of the power cost reduced by the control.

Thus, the user can set the energy-saving operation of the apparatuses 200 according to time and a lifestyle. Although there may be a feeling of inconvenience, the information on the current operational status of the apparatuses 200 is disclosed so as to reduce the user's discomfort at the control.

According to the third embodiment as described above, it is possible, as with the second embodiment, to provide the generator control system capable of reducing the purchase of the commercial power for the rapid increase of the power consumption of the apparatuses 200 and exploiting the cost merit of the introduction of the generator.

This embodiment is the essential configuration in the closed-system power supply system assuming no purchase of the commercial power.

The apparatus power consumption estimating portion 340 gathers information from the apparatus power consumption measuring portion 210, the environment measuring portion 260 and the apparatus operation control portion 320 so as to check whether or not the measured power consumption is per estimated power consumption and modify the power consumption estimation model at anytime. Therefore, it has an effect that the power consumption of the apparatuses 200 can be simulated with higher accuracy than the second embodiment.

Fourth Embodiment

Next, a fourth embodiment will be described.

The second embodiment described the case where the generator control system is connected to the commercial electrical system 380, and on occurrence of power shortage, it estimates the power consumption of the apparatuses 200 while having the power equivalent to the shortage supplied from the commercial electrical system 380 and controls the set state (setting parameters) of the apparatuses 200 by using the estimation result so that the power consumption of the air conditioner 200 exceeds the generating capacity of the generator 100. However, the fourth embodiment will describe the generator control system not connected to the commercial electrical system 380 and so having no commercial power supplied from the commercial electrical system 380.

Figure 4:
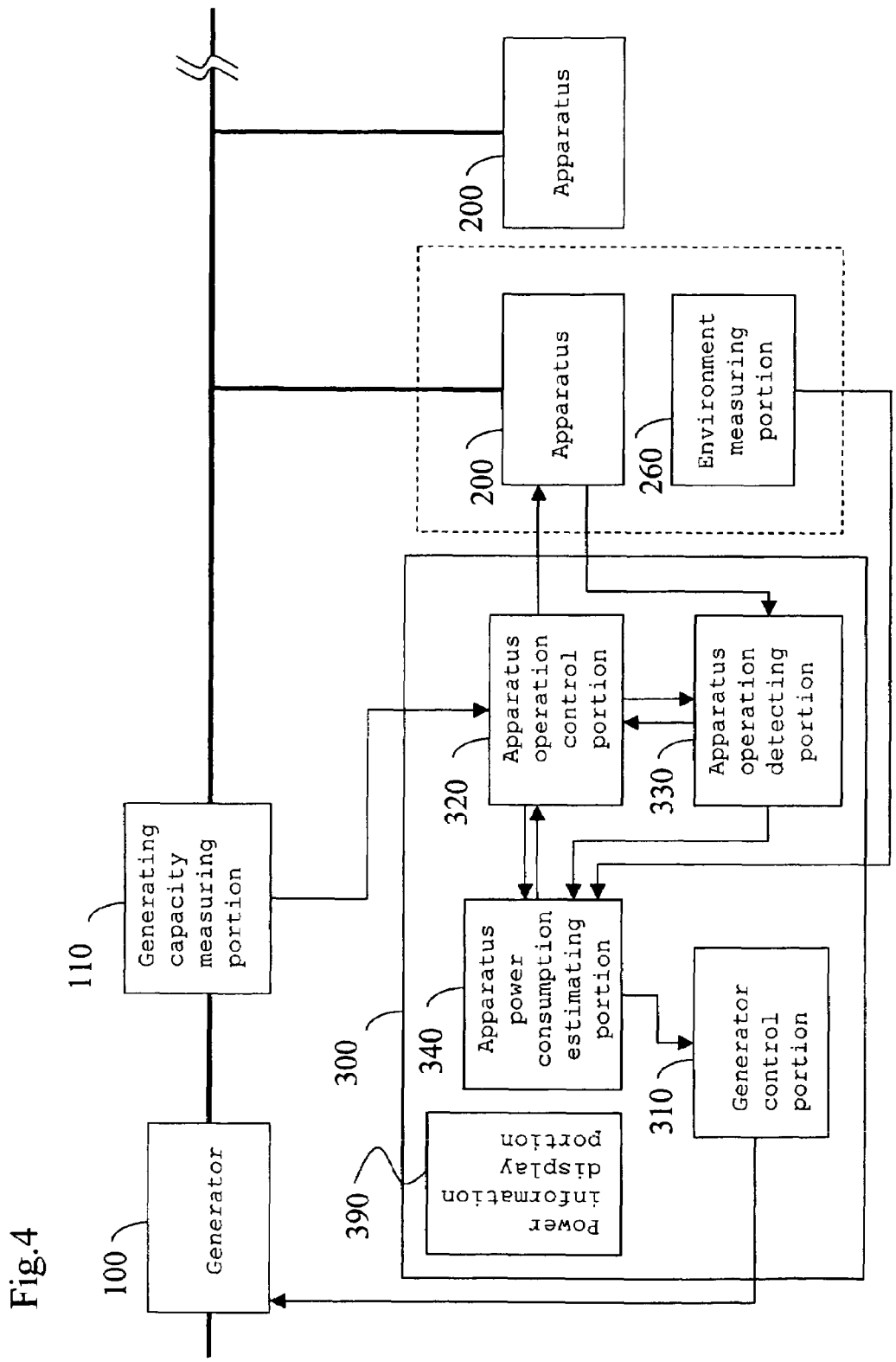
FIG. 4 is a block diagram of the generator control system according to a fourth embodiment of the present invention.

FIG. 4 is a block diagram of the generator control system according to this embodiment.

The generator control system according to the fourth embodiment is not connected to the commercial electrical system 380 unlike the generator control system according to the second embodiment. Therefore, the generator control system of the fourth embodiment has no commercial power supplied from the commercial electrical system 380.

Otherwise, the generator control system of the fourth embodiment has the same configuration as that of the second embodiment.

Next, the operation of this embodiment will be described by centering on the differences from the second embodiment.

Here, the case where the apparatus 200 is the inverter air conditioner (hereafter, described as the air conditioner 200) as in the second embodiment will be described.

If the user turns on the air conditioner 200 in the state in which the generator 100 is in operation with the constant generating capacity and the air conditioner 200 is off, the apparatus operation detecting portion 330 detects it immediately and outputs the current set state of the air conditioner 200 to the power consumption estimating portion 340 at once.

The power consumption estimating portion 340 estimates the power consumption in the case of operating the air conditioner 200 in the set state. To be more precise, it obtains the outside air temperature and room temperature of a room having the air conditioner 200 installed therein from the environment measuring portion 260 and uses a power consumption estimation model such as a regression line (or a regression curve) of which variables are a difference between the set temperature and the outside air temperature, a difference between the set temperature and the room temperature and the capacity or a neural network of which inputs are the room temperature, outside air temperature, set temperature and capacity so as to perform the estimation.

To be more specific, the power consumption estimating portion 340 holds a control algorithm of determining control parameters (a fan rotation frequency and so on) of the air conditioner and a power consumption table on operating it with the determined control parameters. And the air conditioner control is simulated from the data on the outside air temperature and the temperature of the room having the air conditioner installed therein so as to estimate the power consumption at each moment.

There is another method of estimating it by using an interpolation function such as the neural network. To be more specific, in the case where the apparatus is the air conditioner, the power consumption at each moment is estimated by using the neural network having learned to output the power consumption by inputting environmental conditions (outside air temperature, room temperature) and the set temperature in advance.

The generator control portion 310 outputs the control signal to the generator 100 so that the power consumption of the apparatus 200 estimated by the power consumption estimating portion 340 will be a generating capacity target of the generator 100. In that case, the apparatus operation control portion 320 exerts control as follows.

If the generator 100 starts to increase the generating capacity according to the control signal from the generator control portion 310, the apparatus operation control portion 320 controls the apparatus 200 so that the power consumption of the air conditioner 200 will not exceed the generating capacity of the generator 100 obtained by the generating capacity measuring portion 110. For instance, if the air conditioner 200 is turned on and has the setting parameters set in the operation mode "air conditioning," the set temperature "25° C." and the capacity "strong," the apparatus operation control portion 320 has the air conditioner 200 operated at the set temperature "27° C." and the capacity "slight" at first.

The apparatus operation control portion 320 exerts the control after the time of turning on and starting the operation of the air conditioner 200 and before the power consumption of the air conditioner 200 exceeds the generating capacity of the generator 100. Therefore, there will be no occurrence of the cases where the total of the power consumption of the air conditioner 200 and so on exceeds the generating capacity of the generator 100 during the period between after the user turns on the air conditioner 200 and before the apparatus operation control portion 320 exerts the control.

Therefore, the same control as that of the second embodiment can be exerted without connecting to the commercial electrical system 380.

According to the fourth embodiment, it was described that, on turning on the air conditioner 200, the apparatus operation control portion 320 immediately controls the set state (setting parameters) of the apparatuses 200 so that the power consumption of the air conditioner 200 will not exceed the generating capacity of the generator 100. However, it is not limited thereto. It is possible that, even in the case where the air conditioner 200 is turned on, the operation of the air conditioner 200 is not started in reality, and it is started only after the apparatus operation control portion 320 starts the control wherein the power consumption of the air conditioner 200 does not exceed the generating capacity of the generator 100. It is also possible, by doing so, to implement the generator control system which does not need to have the commercial power supplied from the commercial electrical system 380.

Fifth Embodiment

Next, a fifth embodiment will be described.

The third embodiment described the case where the generator control system is connected to the commercial electrical system 380, and on occurrence of the power shortage, it estimates the power consumption of the apparatuses 200 while having the power equivalent to the shortage supplied from the commercial electrical system 380 and controls the set state (setting parameters) of the apparatuses 200 by using the estimation result and improve the estimation accuracy of the power consumption of the apparatus 200 by using the measurement thereof. However, the fifth embodiment will describe the generator control system not connected to the commercial electrical system 380 and so having no commercial power supplied from the commercial electrical system 380.

Figure 5:
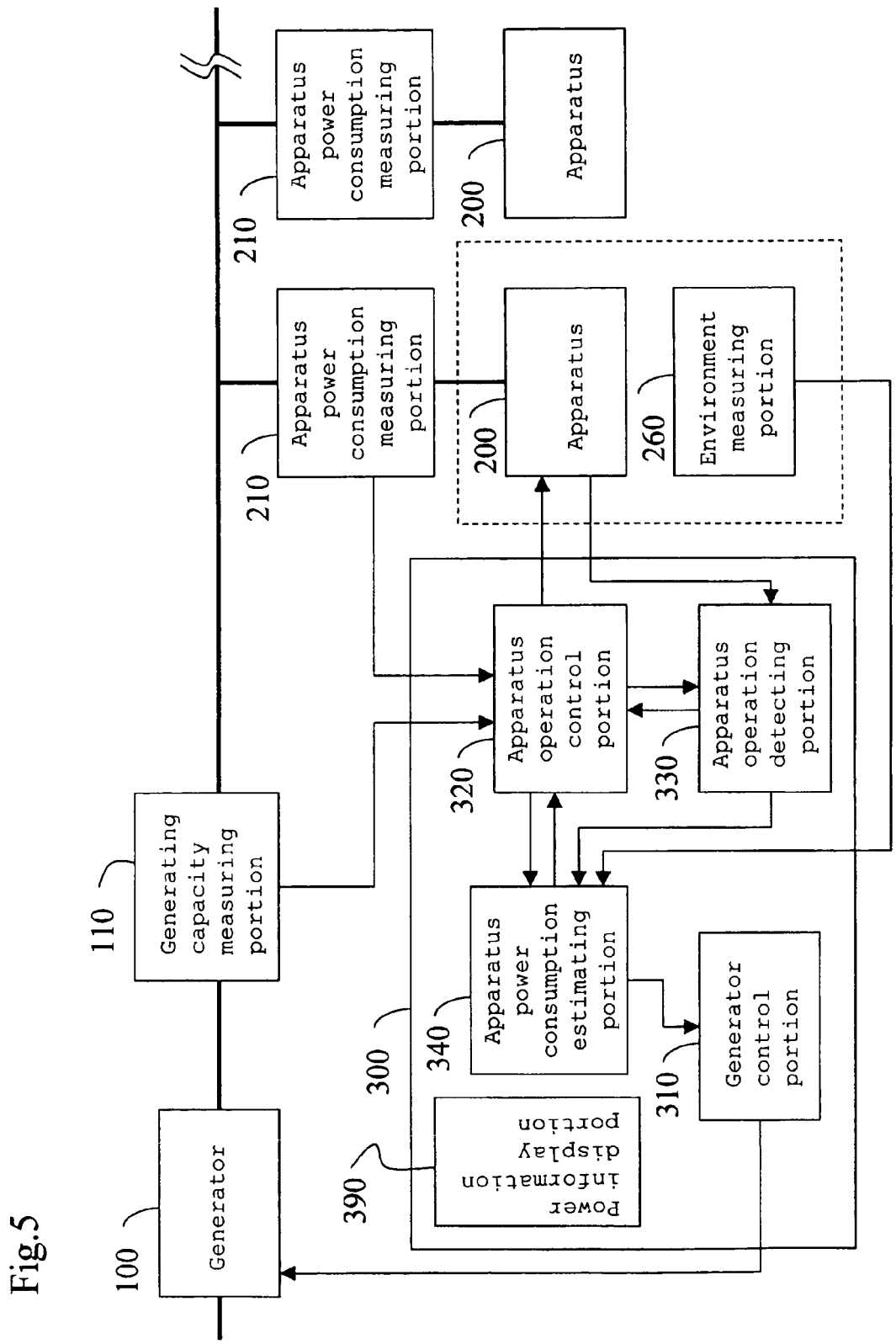
FIG. 5 is a block diagram of the generator control system according to a fifth embodiment of the present invention.
Figure 6:
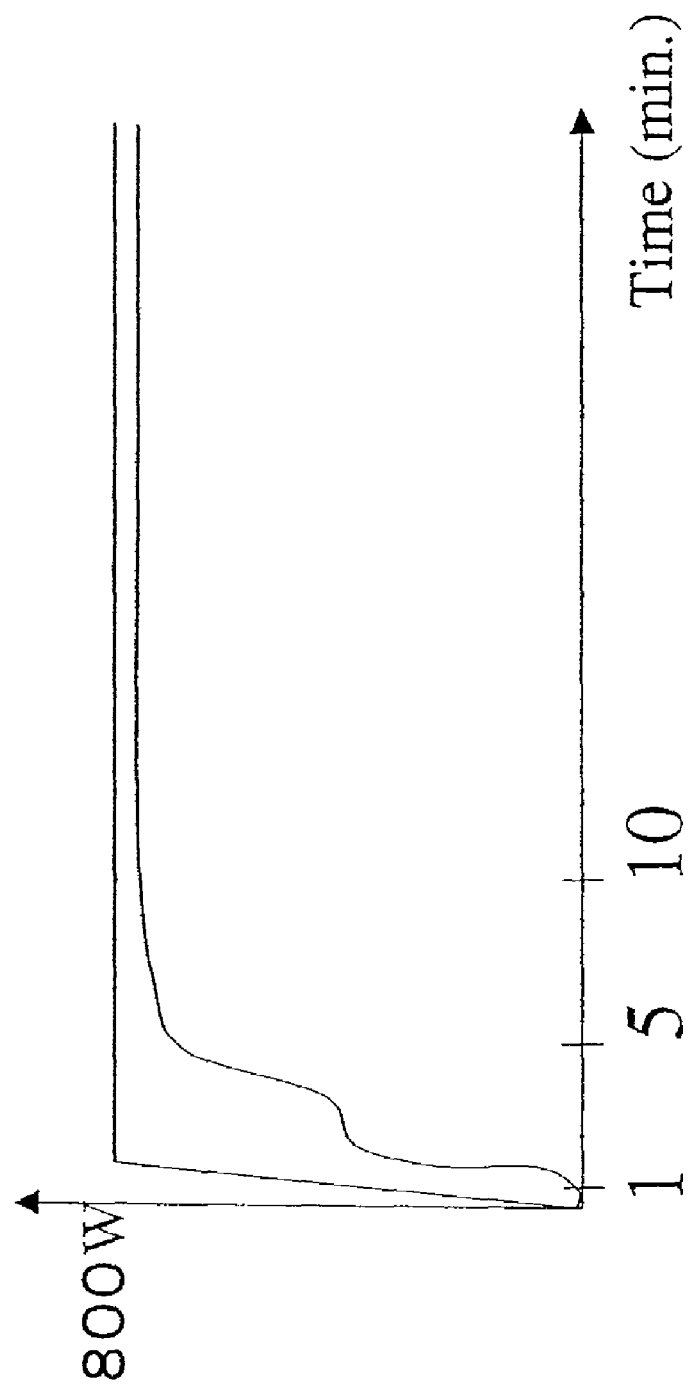
FIG. 6 shows a graph of time-shift of power consumption on starting an air conditioner.

FIG. 5 is a block diagram of the generator control system according to this embodiment.

The generator control system according to the fifth embodiment is not connected to the commercial electrical system 380 unlike the generator control system according to the third embodiment. Therefore, the generator control system of the fifth embodiment has no commercial power supplied from the commercial electrical system 380.

Otherwise, the generator control system of the fifth embodiment has the same configuration as that of the third embodiment.

Next, the operation of this embodiment will be described by centering on the differences from the third and fourth embodiments.

The case where the apparatus 200 is the inverter air conditioner (hereafter, described as the air conditioner 200) will be described.

If the user turns on the air conditioner 200 in the state in which the generator 100 is in operation with the constant generating capacity and the air conditioner 200 is off, the apparatus operation detecting portion 330 detects it immediately and outputs the current set state of the air conditioner 200 to the power consumption estimating portion 340 at once.

The apparatus power consumption estimating portion 340 estimates the power consumption of the air conditioner 200 as in the fourth embodiment. The generator control portion 310 outputs the control signal to the generator 100 so that the power consumption of the apparatus 200 estimated by the power consumption estimating portion 340 will be the target generating capacity of the generator 100. And the apparatus operation control portion 320 controls the apparatus 200 as in the fourth embodiment. The apparatus operation control portion 320 exerts the control after the time of turning on and starting the operation of the air conditioner 200 and before the power consumption of the air conditioner 200 exceeds the generating capacity of the generator 100. Therefore, in the case where the power consumption estimating portion 340 can estimate the power consumption with high accuracy, there will be no occurrence of the cases where the total of the power consumption of the air conditioner 200 and so on exceeds the generating capacity of the generator 100 during the time between after the user turns on the air conditioner 200 and before the apparatus operation control portion 320 exerts the control.

Therefore, the same control as that of the second embodiment can be exerted without connecting to the commercial electrical system 380.

According to the fifth embodiment, it was described that, on turning on the air conditioner 200, the apparatus operation control portion 320 controls the set state (setting parameters) of the air conditioner 200 at once so that the power consumption of the air conditioner 200 will not exceed the generating capacity of the generator 100. However, it is not limited thereto. It is possible that, even in the case where the air conditioner 200 is turned on, the operation of the air conditioner 200 is not started in reality, and it is started only after the apparatus operation control portion 320 starts the control wherein the power consumption of the air conditioner 200 does not exceed the generating capacity of the generator 100. It is also possible, by doing so, to implement the generator control system which does not need to have the commercial power supplied from the commercial electrical system 380.

As in the third embodiment, the power consumption estimating portion 340 gathers information from the apparatus power consumption measuring portion 210, the environment measuring portion 260 and the apparatus operation control portion 320 so as to modify the power consumption estimation model at any time. To be more specific, in the case where the power consumption estimated by the power consumption estimating portion 340 is different from the actual power consumption of the air conditioner 200 measured by the apparatus power consumption measuring portion 210, the power consumption estimating portion 340 modifies the power consumption estimation model so that the estimated power consumption gets closer to the actual power consumption of the air conditioner 200.

In the case where the power consumption measured by the apparatus power consumption measuring portion 210 of the air conditioner 200 matches with the generating capacity of the generator 100, however, there is a possibility that the power meeting a load of the air conditioner 200 is not being supplied from the generator 100. Therefore, on modifying the power consumption estimation model, the power consumption estimating portion 340 does not use the power consumption measured by the apparatus power consumption measuring portion 210 of the air conditioner 200 in the case where the power consumption measured by the apparatus power consumption measuring portion 210 of the air conditioner 200 matches with the generating capacity of the generator 100. To be more specific, the power consumption estimating portion 340 uses the power consumption measured by the apparatus power consumption measuring portion 210 of the air conditioner 200 to modify the power consumption estimation model only in the case where the generating capacity of the generator 100 is larger than the power consumption of the air conditioner 200 measured by the apparatus power consumption measuring portion 210 by a predetermined value or more.

As it is the same as the third and fourth embodiments otherwise, a description thereof will be omitted. The set temperature of the air conditioning is taken as an example of the predetermined setting parameter of the apparatuses 200. However, it may also be strong wind of the air conditioning.

Furthermore, the apparatus of the present invention is the air conditioner in the embodiments. However, it may also be another power-consuming apparatus, such as a lighting apparatus having an illumination adjusting function.

Furthermore, the apparatus of the present invention may also be the one of those which power consumption is changeable by control, such as an electric heater, an oil far-infrared heater, a futon dryer, a hydronic heating toilet seat, a garbage disposal unit, a refrigerator or a freezer.

In the case where there are a plurality of the apparatuses connected to the same generator, the power consumption thereof should be determined by the total.

In the case where there are a plurality of the apparatuses, the apparatus operation control portion can also exert control to keep priorities in reducing the power consumption of the apparatuses and reduce the power consumption of each of the apparatuses according to the priorities.

In the case where the generating capacity of the generator obtained from the generating capacity measuring portion exceeds a rated power value, the apparatus operation control portion can also exert control to reduce the power consumption of the apparatuses.

Thus, the power for use of the apparatuses is bought less often from the power company during the time when cost per unit electric energy is high, such as daytime in hot summer, and so it produces the effect of reducing a cost burden of the user.

The apparatus operation control portion can also comprise an apparatus control selecting portion of selecting whether or not to control the apparatuses.

Furthermore, it may also have the configuration wherein the user can set up registration of the apparatus 200 to be controlled, the priorities and so on through an interface screen.

Sixth Embodiment

FIG. 7 is a block diagram of a power control system according to this embodiment.

In FIG. 7, the generator 100 is the fuel battery, gas turbine, gas engine and so on. The generating capacity measuring portion 110 is the apparatus which is mounted on the output line of the generator 100 and measures the generating capacity of apparatuses 100. The generating capacity in this case refers to the instantaneous power generated by the generator 100. An external power source 150 is an entity selling the power (power company or something similar). And a master power measuring portion 170 is an apparatus of measuring all the power consumption in the household. Both the generating capacity measuring portion 110 and master power measuring portion 170 use the power sensor and so on.

The general apparatus 200 is the apparatus of which unique function is used by the user when desired, such as an air conditioner, a heating apparatus, a lighting or a rice cooker. A specific apparatus 250 is an apparatus of which function can be stopped entirely or partially for the interest of the user even if its power is on, such as the function of fermentation operation of a garbage disposal unit, ventilation operation of an underfloor ventilator, watering of an automatic sprinkler, water-storing tank thermal insulation of a water-storing hydronic heating toilet seat or charging of a battery-driven cleaner. Classification of the general apparatus 200 and specific apparatus 250 is performed by an input to the control portion 300 described later.

The generating capacity of the generator 100 is supplied to the general apparatus 200 and specific apparatus 250 via a distribution board and a power line for household use so as to be consumed.

The control portion 300 is physically comprised of a CPU, a memory, a communication processing portion and so on. In the control portion 300, reference numeral 350 denotes a communication interface corresponding to the communication media such as the private line, radio and power line, and which is connected to the generating capacity measuring portion 110, master power measuring portion 170 and all the apparatuses in the household, that is, all of the general apparatuses 200 and specific apparatuses 250. The control portion 300 can obtain the generating capacity, master power and operational status of the general apparatus 200 and specific apparatus 250 and send the control signals to the apparatuses via the communication interface 350. A specific apparatus control portion 360 is the apparatus of controlling the specific apparatus 250. A specific apparatus setting portion 370 is the apparatus with which the user sets up the specific apparatus 250, and has a screen interface and an input device.

The information on the generating capacity measured by the generating capacity measuring portion 110 may be directly inputted to the specific apparatus control portion 360 to be AD converted and computed without going through the communication interface 350. Likewise, the information on the power consumption of all the general apparatuses 200 and specific apparatuses 250 measured by the master power measuring portion 170 may be directly inputted to the specific apparatus control portion 360 to be AD converted and computed without going through the communication interface 350.

Next, the operation of this embodiment will be described.

First, the user sets up the specific apparatus 250 with the specific apparatus setting portion 370. The specific apparatus setting portion 370 obtains and holds profile information on all the apparatuses in the household, that is, attributes, the functions, the power consumption in the case of using the functions and so on via the communication interface 350, and displays the contents of the apparatus when installed so as to inform the user thereof. As for a method of informing the user, not only display but also voice may be used. On seeing the displayed profile information on the apparatus, the user selects whether or not to regard all or a part of the functions of the apparatus as the specific apparatus 250.

For instance, if the user purchases the garbage disposal unit and turns it on, the specific apparatus setting portion 370 obtains the profile information on the garbage disposal unit via the communication interface 350 and displays the contents thereof on the screen. For instance, as to the fermentation operation in the profile information on the garbage disposal unit, if the user determines that it may be operated by using surplus power of the generator 100 as a stoppable function, then the garbage disposal unit is registered as the specific apparatus 250. In this case, the user may also prepare a specification wherein the garbage disposal unit can set up time for one continuous fermentation operation, total time of the fermentation operation per day, the shortest interval to stop the fermentation operation and so on. It may also be the specification in which the priorities in using the surplus power can be set up so as to determine the operation of the specific apparatus 250 based on the priorities. The information on the registered specific apparatus 250 looks like the table in FIG. 8 for instance. The specific apparatus setting portion 370 outputs this table to the specific apparatus control portion 360.

The general apparatus 200 is also set up likewise. The apparatus to be registered as the general apparatus 200 should desirably be the apparatus of which unique function is used by the user when desired and having high power consumption, such as the air conditioner or rice cooker for instance.

It can be freely determined according to the user s convenience whether a certain apparatus should be set up as the specific apparatus 250 or the general apparatus 200.

Hereafter, a description will be given as to the state in which the general apparatus 200 is an air conditioner and the generator 100 is operating by controlling the generating capacity to follow the power consumption of the air conditioner.

Figure 9:
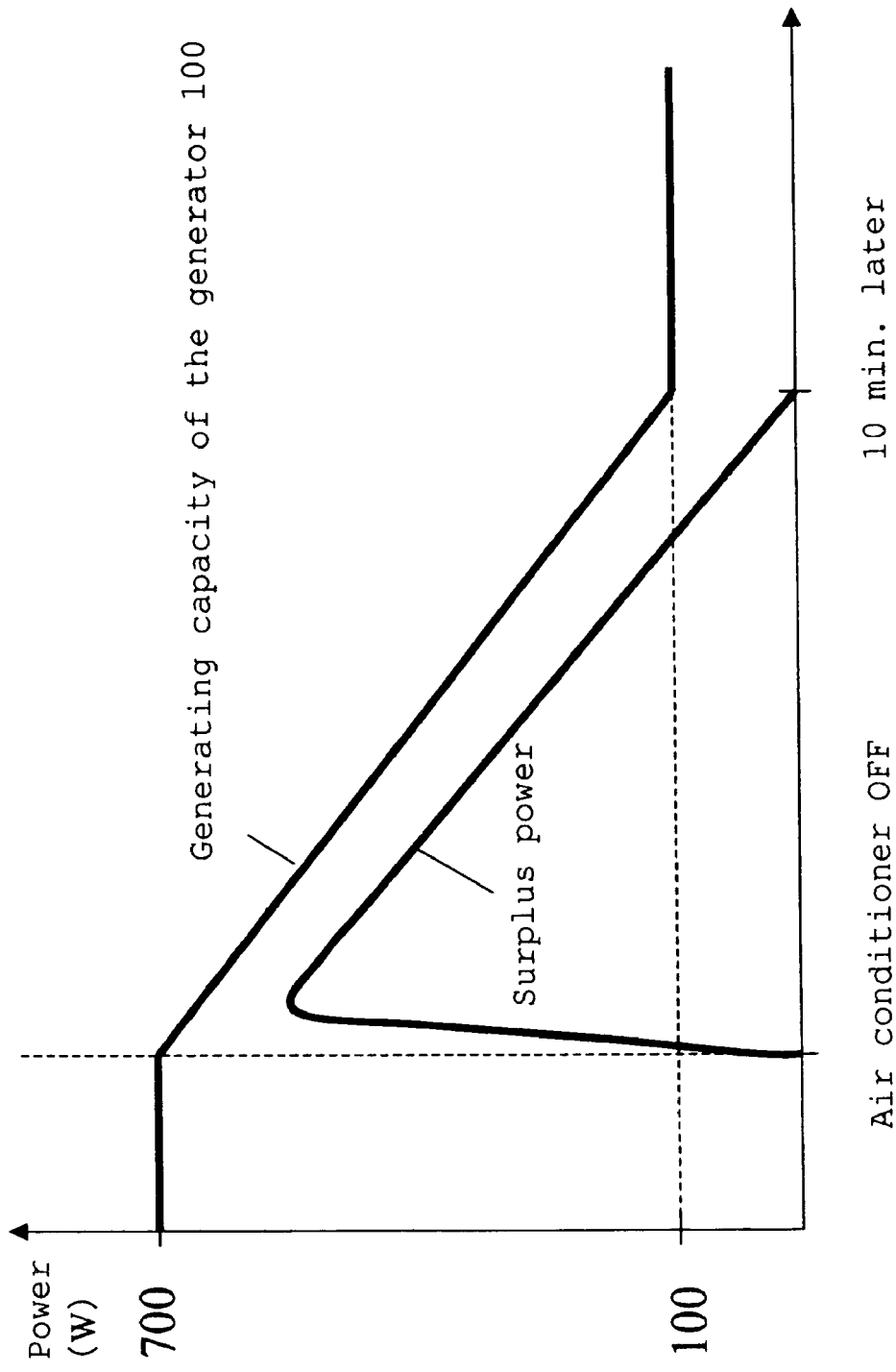
FIG. 9 shows a graph of time-shift of surplus power.

If the user stops the air conditioner, the power consumption of the air conditioner drops rapidly during over 10 seconds so that the generator 100 generates a large amount of the surplus power. For instance, if the air conditioner stops when it is operating at 600 W and the generator 100 is generating electricity at 700 W by following the master power measuring portion 170, the master power drops to 100 W or so in over 10 seconds. In the case where the generator 100 is the fuel battery, it takes about 10 minutes to reduce 600 W output as in FIG. 9, and all the generating capacity during that time is entirely the surplus power.

Thus, the specific apparatus control portion 360 controls the operation of the registered specific apparatuses 250 by using the surplus power. On detecting the stop of the air conditioner via the communication interface 350, the specific apparatus control portion 360 calculates the surplus power by taking a difference between the generating capacity of the generator 100 obtained from the generating capacity measuring portion 110 and the entire power consumption in the household obtained from the master power measuring portion 170.

Next, the functions of the specific apparatuses 250 operated with the surplus power are seen from the table in FIG. 8 according to the priorities. For first several seconds, the surplus power is low so that they are controlled in increasing order of the power consumption such as turning on the watering of the automatic sill cock and then the ventilation of the ventilator. If the surplus power drastically increases, it becomes possible to operate the specific apparatuses of high power consumption, and so thermal insulation operation of the water-storing hydronic heating toilet seat, fermentation operation of the garbage disposal unit and ventilation operation of the underfloor ventilator become on respectively at the time when the surplus power becomes maximum in FIG. 9 so as to consume about 590 W in total. If the surplus power drops, the apparatuses stop the operation in order from the one of the lowest priority. If the surplus power becomes less than 400 W, the operations of fermentation of the garbage disposal unit, charging of a battery-driven cleaner, ventilation of the underfloor ventilator, and watering of an automatic sill cock become on respectively so as to consume about 263 W in total. It is desirable to have the surplus power consumed by the specific apparatuses 250 when possible. If there arises an excess by any means, it is used to charge the external power source 150 as before.

As described above, according to the first embodiment, the specific apparatus control portion 360 controls the operation of the functions of the specific apparatuses 250 set by the user in the specific apparatus setting portion 370 in the case where the surplus power is generated. Thus, the amount of the surplus power used to charge the external power source 150 is reduced and effectively used on the apparatuses in the household when possible so as to maximize the merit of utility charges of the household reduced by the introduction of the generator.

According to this embodiment, it was described that, when the operation of the general apparatus 200 is stopped and the surplus power is generated, the specific apparatus control portion 360 starts from the operation of the function of the specific apparatus 250 of which power consumption is low by referring to the table in FIG. 8, and stops the operation from the specific apparatus 250 of a low priority in the table in FIG. 8 when the surplus power becomes little. However, it is not limited thereto, but it is also feasible, when the operation of the general apparatus 200 is stopped and the surplus power is generated, to perform management to refer to FIG. 8 and start the operation from the function of the specific apparatus 250 following the function of the specific apparatus 250 lastly operated last time the surplus power was generated.

To be more specific, when the surplus power is first generated, the specific apparatus control portion 360 starts the operation of the functions of the specific apparatuses 250 according to the priorities in the table in FIG. 8, that is, beginning at the top of the table in FIG. 8. And if the surplus power begins to runs out, it stops the operation of the functions of the specific apparatuses 250 beginning at the top of the table in FIG. 8. In the case where the surplus power is generated next, it starts the operation from the function of the specific apparatus 250 following the function of the specific apparatus 250 lastly operated last time.

To be more precise, when the surplus power is first generated, it operates the function of the water-storing tank thermal insulation operation of the water-storing hydronic heating toilet seat. As there is still excess surplus power, it operates the function of the fermentation operation of the garbage disposal unit (biotech method). Here, if the surplus power begins to runs out, then it stops the function of the water-storing tank thermal insulation operation of the water-storing hydronic heating toilet seat and the function of the fermentation operation of the garbage disposal unit (biotech method) next. If the surplus power is generated next, it starts the operation from the function of charging the battery-driven cleaner following the function of the fermentation operation of the garbage disposal unit (biotech method) of which operation was lastly started last time.

Thus, when the surplus power is generated, it is possible, by referring to the table in FIG. 8 and cyclically operating the functions of the specific apparatuses 250, to avoid a problem such as having some of the functions of the specific apparatuses 250 frequently operated or having some of them hardly operated. To be more specific, it is possible to operate the functions of the specific apparatuses 250 equally.

Furthermore, according to this embodiment, it was described that, when the operation of the general apparatus 200 is stopped and the surplus power is generated, the specific apparatus control portion 360 starts the operation from the function of the specific apparatus 250 of which power consumption is low by referring to the table in FIG. 8, and stops the operation from the specific apparatus 250 of a low priority in the table in FIG. 8 when the surplus power becomes little. However, it is not limited thereto, but it is also feasible, when operating the general apparatus 200 with the surplus power generated, to stop the functions of the specific apparatuses 250 exceeding time per operation in the table in FIG. 8 even if they are operable.

For instance, when the surplus power is generated and the function of the fermentation operation of the garbage disposal unit (biotech method) is operated, the specific apparatus control portion 360 stops the operation of this function if it exceeds 3 minutes as the time per operation even though there is the excess surplus power and the function of the fermentation operation of the garbage disposal unit (biotech method) is operable.

It is thereby possible to avoid driving the functions of the specific apparatuses 250 too often so as to adequately operate these functions. As for the function of the water-storing tank thermal insulation operation of the water-storing hydronic heating toilet seat, the table in FIG. 8 describes that the time per operation is variable subject to settings. It means that the temperature of hot water in the water-storing tank is measured and the time per operation is set according to the measured temperature of the hot water.

Furthermore, according to this embodiment, it was described that, when the operation of the general apparatus 200 is stopped and the surplus power is generated, the specific apparatus control portion 360 starts the operation from the function of the specific apparatus 250 of which power consumption is low by referring to the table in FIG. 8, and stops the operation from the specific apparatus 250 of a low priority in the table in FIG. 8 when the surplus power becomes little. However, it is not limited thereto, but it is also feasible, when the surplus power is generated, to start the operation from the function of the specific apparatus 250 of which priority is high by referring to the table in FIG. 8 and stop the operation of the function of the specific apparatus 250 from the one of the lowest priority when the surplus power becomes little. In this case, the specific apparatus control portion 360 monitors the time elapsed from finishing the operation of the functions of the specific apparatus 250 last time. In the case where the elapsed time has not exceeded interval time in FIG. 8, it does not operate the specific apparatus 250 even if its priority is high.

For instance, when the surplus power is generated, the specific apparatus control portion 360 first tries to start the operation of the function of the water-storing tank thermal insulation operation of the water-storing hydronic heating toilet seat of which priority is highest. However, it does not operate that specific apparatus 250 because the elapsed time thereof has not exceeded the interval time. Next, the specific apparatus control portion 360 tries to start the operation of the function of the fermentation operation of the garbage disposal unit (biotech method) of which priority is next to the highest. If the elapsed time of the specific apparatus 250 is less than 60 minutes as the interval time, the specific apparatus control portion 360 starts the operation of the specific apparatus 250.

Thus, it is possible to avoid the problem of excessively operating only the functions of some specific apparatuses 250. As for the function of the water-storing tank thermal insulation operation of the water-storing hydronic heating toilet seat, the table in FIG. 8 describes that the time per operation is variable subject to settings. It means that the temperature of hot water in the water-storing tank is measured and the interval time is set according to the measured temperature of the hot water.

Furthermore, according to this embodiment, it was described that, when the operation of the general apparatus 200 is stopped and the surplus power is generated, the specific apparatus control portion 360 starts the operation from the function of the specific apparatus 250 of which power consumption is low by referring to the table in FIG. 8, and stops the operation from the specific apparatus 250 of a low priority in the table in FIG. 8 when the surplus power becomes little. However, it is not limited thereto.

It is also feasible to manage the order of starting the operation of the specific apparatuses 250 and the order of finishing the operation thereof by having the table in FIG. 8 referred to by the apparatus operation control portion 320. To be more specific, the interval time in FIG. 8 is the shortest time until the function of the specific apparatus 250 is operated again after being operated once, and the specific apparatus control portion 360 is not operated again unless the interval time elapses since it was operated last time. Therefore, the priorities of the specific apparatuses 250 which have not been operated again for the interval time or longer are raised, and the priorities of the specific apparatuses 250 of which interval time has not elapsed are lowered. And when the surplus power is generated, the specific apparatus control portion 360 starts the operation of the specific apparatuses 250 in lowering order of priority and stops the operation of the specific apparatuses 250 beginning at the one having the lowest priority in the table in FIG. 8.

Thus, it is possible to operate the functions of the specific apparatuses 250 at adequate operation intervals so as to avoid the problem of having some of the functions of the specific apparatuses 250 frequently operated or having some of them hardly operated.

Furthermore, according to this embodiment, it was described that the specific apparatus setting portion 370 sets up the specific apparatuses 250 according an instruction from the user. However, it is not limited thereto. A configuration without the specific apparatus setting portion 370 is also possible. To be more specific, each of the apparatuses should have the information indicating whether it is the general apparatus 200 or the specific apparatus 250 in advance. To be more precise, each of the apparatuses should have the information indicating whether each of the functions thereof is the function of the general apparatus 200 or the function of the specific apparatus 250 together with the above-mentioned profile information. And the specific apparatus control portion 360 obtains from the apparatuses the information indicating whether each of the functions thereof is the function of the general apparatus 200 or the function of the specific apparatus 250 and creates the table in FIG. 8 so as to exert the above-mentioned control based on this table.

Furthermore, according to this embodiment, it was described that, when the operation of the general apparatus 200 is stopped and the surplus power is generated, the specific apparatus control portion 360 starts the operation from the function of the specific apparatus 250 of which power consumption is low by referring to the table in FIG. 8, and stops the operation from the specific apparatus 250 of a low priority in the table in FIG. 8 when the surplus power becomes little. However, it is not limited thereto. In the case where the power consumption of the specific apparatus 250 is settable in stages, it is feasible, when the operation of the general apparatus 200 is stopped and the surplus power is generated, to start the operation of the specific apparatus 250 from the state of low power consumption and exert control to increase the power consumption of the specific apparatus 250 in stages, and to exert control to reduce the power consumption of the specific apparatus 250 in stages when the surplus power becomes little.

The case where the power consumption is settable in stages may include the following cases for instance. To be more specific, it is the case where the water-storing hydronic heating toilet seat has a temperature setting function. And it is the case where the operation of the garbage disposal unit (biotech method) is switchable among strong, medium and weak. It is the case where the operation of the underfloor/ceiling ventilator is switchable among strong, medium and weak. And it is the case where the watering amount of the automatic sill cock is switchable among strong, medium and weak.

Furthermore, as described above, the surplus power is generated when the operation of the general apparatus 200 is stopped, and then the operation is started from the function of the specific apparatus 250 of which power consumption is low by referring to the table in FIG. 8. In the case where the operation of the general apparatus 200 is restarted in such a state, the surplus power becomes little so that the operation of the specific apparatuses 250 is stopped from the one of a low priority in the table in FIG. 8. In such a case, it is possible, instead of stopping the operation of the specific apparatuses 250 from the one of a low priority in the table in FIG. 8, to have the user select the specific apparatus 250 of which operation should be continued so as to exert control to continue the operation of the specific apparatus 250 selected by the user and stop the operation of the specific apparatus 250 not selected by the user.

The program of the present invention is the one of causing a computer to perform all or a part of the functions of the above-mentioned generator control system or power control system of the present invention, which is the program of operating in cooperation with the computer.

The record medium of the present invention is the one recording the program of causing the computer to perform all or a part of the functions of the above-mentioned generator control system or power control system of the present invention, wherein the program readable and read by the computer performs the functions in cooperation with the computer.

One form of use of the program of the present invention may be the form recorded on the record medium readable by the computer and operating in cooperation with the computer.

Another form of use of the program of the present invention may be the form transmitted in a transmission medium, read by the computer and operating in cooperation with the computer.

The record medium includes an ROM and so on, and the transmission medium includes the transmission medium such as the Internet, light, an electric wave or a sound wave.

The above-mentioned computer of the present invention is not limited to pure hardware such as a CPU but may include firmware, an OS and also peripherals.

As described above, the configuration of the present invention may be implemented either software-wise or hardware-wise.

The generator control system, generating apparatus control method, power control system, power control method, program and record medium according to the present invention control household electrical appliances so that the power consumption of the household electrical appliances will not exceed the generating capacity of the generator, and so they have the effect of eliminating the purchase of the commercial power and maximizing the cost merit of introducing the generator. Therefore, they are useful for the generator control system, generating apparatus control method, power control system, power control method, program and record medium of matching an electric load of the household electrical appliances to the output of the generator.

What is claimed is:

1. A generator control system comprising:
   an apparatus power consumption estimator configured to estimate a power consumption by an apparatus from a value of an operation setting parameter of the apparatus when an apparatus operation detector detects a new value of the operation setting parameter corresponding to an increase in the power consumption by the apparatus;

a generator controller configured to increase power output of a generator based on the power consumption estimated by the apparatus power consumption estimator; and an apparatus operation controller configured to control the apparatus to vary the value of the operation setting parameter to approach the new value of the operation setting parameter, so that the power consumption by the apparatus corresponds to the increased power output of the generator.

2. The generator control system according to claim 1, wherein the generator controller, which is configured to output a control signal to the generator according to a predetermined value of the operation setting parameter when the apparatus operation detector detects a change of the predetermined value of the operation setting parameters of the apparatus, outputs the control signal to the generator based on the data held in advance indicating a relation between the predetermined value of the operation setting parameter of the apparatus and the power consumption of the apparatus.

3. The generator control system according to claim 1, wherein the apparatus operation controller controls the apparatus to operate in a different value of the operation setting parameter from the new value of the operation setting parameter detected by the apparatus operation detector so that the power consumption estimated by the apparatus power consumption estimator is increased to meet the increase in the generating power of the generator.

4. The generator control system according to claim 1, wherein the generator controller outputs a control signal to the generator based on data held in advance indicating a relation between a predetermined value of the operation setting parameter of the apparatus and the estimated power consumption of the apparatus.

5. The generator control system according to claim 1, further comprising:

an environment measuring unit configured to measure environment information on an environment of the apparatus, wherein the apparatus power consumption estimator estimates the power consumption of the apparatus based on a predetermined value of the operation setting parameter of the apparatus and the measured environment information.

6. The generator control system according to claim 1, further comprising:

an environment measuring unit configured to measure environment information on an environment of the apparatus; and an apparatus power consumption measuring unit configured to measure the power consumption of the apparatus, wherein the apparatus power consumption estimator estimates the power consumption based on a power consumption estimation model, the apparatus power consumption estimator modifying the power consumption estimation model based on information received from the apparatus power consumption measuring unit, the environment measuring unit and the apparatus operation controller.

7. The generator control system according to claim 6, wherein, when the generator generates enough power compared to the power consumption measured by the apparatus power consumption measuring unit, the operation setting parameter is controlled so that the estimated power consumption meets the generating power of the generator.

8. The generator control system according to claim 1 or 3, further comprising an apparatus power consumption measuring unit configured to measure the power consumption of the apparatus, wherein the apparatus operation controller controls the value of the operation setting parameter to reduce the power consumption of the apparatus in the case where a measured generating power of the generator exceeds a rated value.

9. The generator control system according to claim 1 or 3, wherein, when the apparatus includes a plurality of apparatus, the apparatus operation controller exerts control to keep priorities in reducing the power consumption of each of the apparatuses and controls the value of the operation setting parameter to reduce the power consumption of each of the apparatuses according to the priorities.

10. The generator control system according to claim 9, further comprising a priority setting unit configured to have the priorities in reducing the power consumption of each of the apparatuses set by a user.

11. The generator control system according to claim 1 or 3, further comprising an apparatus control selector for selecting or deselecting whether or not the apparatus operation controller controls the apparatus.

12. The generator control system according to claim 1 or 3, further comprising a power information display for displaying the apparatus controlled by the apparatus operation controller, a measured power consumption of the apparatus or an estimated power consumption of the apparatus and a measured generating consumption of the generator.

13. The generator control system according to claim 1 or 3, wherein the apparatus is a domestic air conditioner, and the apparatus operation controller controls at least one of preset temperature, air volume and air cleaning functions of the domestic air conditioner a plurality of times.

14. The generator control system according to claim 1 or 3, wherein the apparatus is an illumination apparatus having an illumination adjustment function.

15. A computer readable recording medium tangibly embodying a program that causes a computer to perform the steps of a generator control method comprising:

an apparatus power consumption estimating step operable to estimate a power consumption by an apparatus from a value of an operation setting parameter of the apparatus when an apparatus operation detector detects a new value of the operation setting parameter set by a user corresponding to an increase in the power consumption by the apparatus;

a generator controlling step operable to increase power output of a generator based on the power consumption estimated by the apparatus power consumption estimating step; and an apparatus operation controlling step operable to control the apparatus to vary the value of the operation setting parameter to approach the new value of the operation setting parameter, so that the power consumption by the apparatus corresponds to the increased power output of the generator.

16. A computer readable recording medium according to claim 15, wherein the apparatus operation controlling step controls the apparatus to operate in a different value of the operation setting parameter from the new value of the operation setting parameter detected by the apparatus operation detecting step so that the power consumption estimated by the apparatus power consumption estimating step is increased to meet the increase in the generating power of the generator.

17. A generator control method comprising:

an apparatus power consumption estimating step operable to estimate a power consumption by an apparatus from a value of an operation setting parameter of the apparatus when an apparatus operation detector detects a new value of the operation setting parameter set by a user corresponding to an increase in the power consumption by the apparatus;

a generator controlling step operable to increase power output of a generator based on the power consumption estimated by the apparatus power consumption estimating step; and an apparatus operation controlling step operable to control the apparatus to vary the value of the operation setting parameter to approach the new value of the operation setting parameter, so that the power consumption by the apparatus corresponds to the increased power output of the generator.

18. The generator control method according to claim 17, wherein the apparatus operation controlling step controls the apparatus to operate in a different value of the operation setting parameter from the new value of the operation setting parameter detected by the apparatus operation detecting step so that the power consumption estimated by the apparatus power consumption estimating step is increased in the generating power of the generator.

* * * * *

UNITED STATES PATENT AND TRADEMARK OFFICE
CERTIFICATE OF CORRECTION

PATENT NO.        : 7,489,988 B2
APPLICATION NO.   : 10/993322
DATED             : February 10, 2009
INVENTOR(S)       : Matsui et al.

It is certified that error appears in the above-identified patent and that said Letters Patent is hereby corrected as shown below:

In column 34, line 14 of the Letters Patent, in claim 18 (Amendment claim 23), "step is increased in the generating power" should read --step is increased to meet the increase in the generating power--.

Signed and Sealed this

Nineteenth Day of May, 2009

JOHN DOLL
*Acting Director of the United States Patent and Trademark Office*